US007920703B2

(12) United States Patent
Candelore

(10) Patent No.: US 7,920,703 B2
(45) Date of Patent: Apr. 5, 2011

(54) DESCRAMBLER

(75) Inventor: Brant L. Candelore, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 52 days.

(21) Appl. No.: 12/402,060

(22) Filed: Mar. 11, 2009

(65) Prior Publication Data

US 2009/0168996 A1    Jul. 2, 2009

Related U.S. Application Data

(62) Division of application No. 10/691,170, filed on Oct. 22, 2003, now Pat. No. 7,508,942, which is a division of application No. 10/388,002, filed on Mar. 12, 2003, now Pat. No. 7,724,907.

(60) Provisional application No. 60/424,381, filed on Nov. 5, 2002.

(51) Int. Cl.
*H04L 9/14*    (2006.01)
(52) U.S. Cl. ............ 380/210; 380/29; 380/228; 380/239
(58) Field of Classification Search .................. None
See application file for complete search history.

(56) References Cited

U.S. PATENT DOCUMENTS

| 4,521,853 A | 6/1985 | Guttag |
| 4,634,808 A | 1/1987 | Moerder |
| 4,785,361 A | 11/1988 | Brotby |
| 4,887,296 A | 12/1989 | Horne |
| 5,111,504 A | 5/1992 | Esserman et al. |
| 5,138,659 A | 8/1992 | Kelkar et al. |
| 5,144,662 A | 9/1992 | Welmer |
| 5,144,664 A | 9/1992 | Esserman et al. |
| 5,151,782 A | 9/1992 | Ferraro |
| 5,237,610 A | 8/1993 | Gammie et al. |
| 5,319,707 A | 6/1994 | Wasilewski et al. |

(Continued)

FOREIGN PATENT DOCUMENTS

CA    2389247    5/2001

(Continued)

OTHER PUBLICATIONS

U.S. Appl. No. 10/962,830 Office Action mailed Dec. 11, 2007.

(Continued)

*Primary Examiner* — Minh Dinh
(74) *Attorney, Agent, or Firm* — Blakely, Sokoloff, Taylor & Zafman LLP

(57) ABSTRACT

According to one embodiment of the invention, the descrambler IC comprises a local memory to store a unique key and a plurality of process blocks. A first process block performs cryptographic operations on a first mating key generator using the unique key in order to produce a first key. A second process block uses the first key to perform cryptographic operations on a second mating key generator in order to produce a second key. Using the first key and the second key, a third process block decrypts a first encrypted descrambling key in order to recover a first descrambling key and a fourth process block decrypts a second encrypted descrambling key to recover a second descrambling key. The descrambler IC includes a descrambler to descramble the scrambled digital content using both the first descrambling key and the second descrambling key in order to produce digital content in a clear format.

16 Claims, 19 Drawing Sheets

U.S. PATENT DOCUMENTS

| | | |
|---|---|---|
| 5,444,491 A | 8/1995 | Lim |
| 5,473,692 A | 12/1995 | Davis |
| 5,485,577 A | 1/1996 | Eyer et al. |
| 5,491,748 A | 2/1996 | Auld, Jr. et al. |
| 5,526,427 A | 6/1996 | Thomas et al. |
| 5,539,828 A | 7/1996 | Davis |
| 5,568,552 A | 10/1996 | Davis |
| 5,574,787 A | 11/1996 | Ryan |
| 5,583,863 A | 12/1996 | Darr, Jr. et al. |
| 5,590,202 A | 12/1996 | Bestler et al. |
| 5,594,507 A | 1/1997 | Hoarty |
| 5,615,265 A | 3/1997 | Coutrot |
| 5,652,795 A | 7/1997 | Dillon et al. |
| 5,666,293 A | 9/1997 | Metz et al. |
| 5,671,276 A | 9/1997 | Eyer et al. |
| 5,699,429 A | 12/1997 | Tamer et al. |
| 5,732,346 A | 3/1998 | Lazaridis et al. |
| 5,757,909 A | 5/1998 | Park |
| 5,768,539 A | 6/1998 | Metz et al. |
| 5,784,464 A | 7/1998 | Akiyama et al. |
| 5,790,842 A | 8/1998 | Charles et al. |
| 5,796,829 A | 8/1998 | Newby et al. |
| 5,796,840 A | 8/1998 | Davis |
| 5,802,176 A | 9/1998 | Audebert |
| 5,805,712 A | 9/1998 | Davis |
| 5,850,218 A | 12/1998 | LaJoie et al. |
| 5,852,290 A | 12/1998 | Chaney |
| 5,923,755 A | 7/1999 | Birch |
| 5,930,361 A | 7/1999 | Hayashi et al. |
| 5,949,877 A | 9/1999 | Traw et al. |
| 5,949,881 A | 9/1999 | Davis et al. |
| 6,021,201 A | 2/2000 | Bakhle et al. |
| 6,026,164 A | 2/2000 | Sakamoto et al. |
| 6,028,932 A | 2/2000 | Park |
| 6,061,451 A | 5/2000 | Muratani et al. |
| 6,069,647 A | 5/2000 | Sullivan et al. |
| 6,088,450 A | 7/2000 | Davis et al. |
| 6,105,134 A | 8/2000 | Pinder et al. |
| 6,108,422 A | 8/2000 | Newby et al. |
| 6,115,821 A | 9/2000 | Newby et al. |
| 6,118,873 A | 9/2000 | Lotspiech et al. |
| 6,134,551 A | 10/2000 | Aucsmith |
| 6,154,206 A | 11/2000 | Ludtke |
| 6,157,719 A | 12/2000 | Wasilewski et al. |
| 6,178,242 B1 | 1/2001 | Tsuria et al. |
| 6,185,546 B1 | 2/2001 | Davis |
| 6,189,096 B1 | 2/2001 | Haverty |
| 6,192,131 B1 | 2/2001 | Geer, Jr. et al. |
| 6,199,053 B1 | 3/2001 | Herbert et al. |
| 6,209,098 B1 | 3/2001 | Davis |
| 6,226,618 B1 | 5/2001 | Downs et al. |
| 6,230,194 B1 | 5/2001 | Frailong et al. |
| 6,230,266 B1 | 5/2001 | Perlman et al. |
| 6,233,577 B1 | 5/2001 | Ramasubramani et al. |
| 6,236,727 B1 | 5/2001 | Ciacelli et al. |
| 6,247,127 B1 | 6/2001 | Vandergeest |
| 6,256,747 B1 | 7/2001 | Inohara et al. |
| 6,263,506 B1 | 7/2001 | Ezaki et al. |
| 6,266,416 B1 | 7/2001 | Sigbjornsen et al. |
| 6,266,480 B1 | 7/2001 | Ezaki et al. |
| 6,272,538 B1 | 8/2001 | Holden et al. |
| 6,278,783 B1 | 8/2001 | Kocher et al. |
| 6,289,455 B1 | 9/2001 | Kocher et al. |
| 6,292,892 B1 | 9/2001 | Davis |
| 6,324,288 B1 | 11/2001 | Hoffman |
| 6,351,538 B1 | 2/2002 | Uz |
| 6,389,533 B1 | 5/2002 | Davis et al. |
| 6,389,537 B1 | 5/2002 | Davis et al. |
| 6,424,717 B1 | 7/2002 | Pinder et al. |
| 6,442,689 B1 | 8/2002 | Kocher |
| 6,445,738 B1 | 9/2002 | Zdepski et al. |
| 6,453,115 B1 | 9/2002 | Boyle |
| 6,466,671 B1 | 10/2002 | Maillard et al. |
| 6,550,008 B1 | 4/2003 | Zhang et al. |
| 6,640,305 B2 | 10/2003 | Kocher et al. |
| 6,643,298 B1 | 11/2003 | Brunheroto et al. |
| 6,650,754 B2 | 11/2003 | Akiyama et al. |
| 6,754,276 B1 | 6/2004 | Harumoto et al. |
| 7,143,289 B2 | 11/2006 | Denning et al. |
| 7,146,007 B1 | 12/2006 | Maruo et al. |
| 7,242,766 B1 | 7/2007 | Lyle |
| 7,254,234 B2 | 8/2007 | Sugahara et al. |
| 7,363,276 B2 * | 4/2008 | Akiyama ......................... 705/55 |
| 7,379,548 B2 * | 5/2008 | Revital et al. ................. 380/240 |
| 2001/0042043 A1 | 11/2001 | Shear et al. |
| 2002/0021805 A1 | 2/2002 | Schumann et al. |
| 2002/0026587 A1 | 2/2002 | Talstra et al. |
| 2002/0044658 A1 | 4/2002 | Wasilewski et al. |
| 2002/0047915 A1 | 4/2002 | Misu |
| 2002/0083439 A1 | 6/2002 | Eldering |
| 2002/0090090 A1 | 7/2002 | Van Rijnsoever et al. |
| 2002/0094084 A1 | 7/2002 | Wasilewski et al. |
| 2002/0097322 A1 | 7/2002 | Monroe et al. |
| 2002/0109707 A1 | 8/2002 | Lao et al. |
| 2002/0184506 A1 | 12/2002 | Perlman |
| 2003/0009669 A1 | 1/2003 | White et al. |
| 2003/0025423 A1 | 2/2003 | Miller et al. |
| 2003/0035540 A1 | 2/2003 | Freeman et al. |
| 2003/0035543 A1 | 2/2003 | Gillon et al. |
| 2003/0059047 A1 | 3/2003 | Iwamura |
| 2003/0072555 A1 | 4/2003 | Yap et al. |
| 2003/0078891 A1 | 4/2003 | Capitant |
| 2003/0084284 A1 | 5/2003 | Ando et al. |
| 2003/0108199 A1 | 6/2003 | Pinder et al. |
| 2003/0157140 A1 | 8/2003 | Takada |
| 2003/0174837 A1 | 9/2003 | Candelore et al. |
| 2003/0188164 A1 | 10/2003 | Okimoto et al. |
| 2003/0204717 A1 | 10/2003 | Kuehnel |
| 2004/0003008 A1 | 1/2004 | Wasilewski et al. |
| 2004/0037421 A1 | 2/2004 | Truman |
| 2004/0047470 A1 | 3/2004 | Candelore |
| 2004/0049688 A1 | 3/2004 | Candelore et al. |
| 2004/0049694 A1 | 3/2004 | Candelore |
| 2004/0086127 A1 | 5/2004 | Candelore |
| 2004/0088541 A1 | 5/2004 | Messerges |
| 2004/0093494 A1 | 5/2004 | Nishimoto et al. |
| 2004/0111613 A1 | 6/2004 | Shen-Orr et al. |
| 2005/0004875 A1 | 1/2005 | Kontio et al. |
| 2005/0021941 A1 | 1/2005 | Ohmori et al. |
| 2005/0144646 A1 | 6/2005 | Lecrom et al. |
| 2005/0169473 A1 | 8/2005 | Candelore |

FOREIGN PATENT DOCUMENTS

| | | |
|---|---|---|
| CA | 2328645 | 7/2001 |
| EP | 0471373 | 2/1992 |
| EP | 0720374 | 7/1996 |
| EP | 0382764 | 4/1997 |
| EP | 0866615 | 9/1998 |
| JP | 07-046575 | 2/1995 |
| JP | 11243534 | 9/1999 |
| WO | WO-8902682 | 3/1989 |
| WO | WO-93/09525 | 5/1993 |
| WO | WO-94/10775 | 5/1994 |
| WO | WO-00/59203 | 10/2000 |
| WO | WO-01/26372 | 4/2001 |
| WO | WO-01/65762 | 9/2001 |
| WO | WO-2004042516 | 5/2004 |

OTHER PUBLICATIONS

U.S. Appl. No. 10/9602,830 Office Action mailed Jun. 26, 2008.
U.S. Appl. No. 10/962,830 Office Action mailed Oct. 28, 2008.
U.S. Appl. No. 10/962,830 Office Action mailed May 5, 2009.
PCT Internal Search Report and Written Opinion, International Application No. PCT/US05/31171, mailed Oct. 26, 2006.
U.S. Appl. No. 10/388,002 Office Action mailed Nov. 17, 2006.
U.S. Appl. No. 10/388,002 Office Action mailed Apr. 27, 2007.
U.S. Appl. No. 10/388,002 Office Action mailed Sep. 7, 2007.
U.S. Appl. No. 10/388,002 Office Action mailed May 6, 2008.
U.S. Appl. No. 10/388,002 Office Action mailed Nov. 19, 2008.
U.S. Appl. No. 10/690,192 Office Action mailed Mar. 12, 2007.
U.S. Appl. No. 10/690,192 Office Action mailed Sep. 5, 2007.
U.S. Appl. No. 10/690,192 Office Action mailed Sep. 24, 2008.
U.S. Appl. No. 10/690,192 Office Action mailed Mar. 4, 2009.
U.S. Appl. No. 10/691,170 Office Action mailed Mar. 16, 2007.
U.S. Appl. No. 10/691,170 Office Action mailed Sep. 27, 007.

U.S. Appl. No. 10/691,170 Office Action mailed Apr. 17, 2008.
U.S. Appl. No. 10/9602,830 Office Action mailed Dec. 8, 2009.
"How Networks Work, Millennium Edition", Que Corporation, (Sep. 2000), 88-89.
Brown, Jessica, "The Interactive Commercial, Coming Soon to a TV Near You", May 2000.
NCUBE, "Digital Program Insertion", (May 2001).

NCUBE, "Smooth Ad Insertion Deployment Protects Revenues", (2004).
OPENTV, "OPENTV to Showcase Several Advanced Interactive Television Solutions at IBC 2004", (Sep. 6, 2004).
PCT Internal Search Report and Written Opinion, International Application No. PCT/US03/35334, mailed Mar. 11, 2004.

* cited by examiner

| Entitlement Management Message | |
|---|---|
| STB Serial Number | (64 bits) |
| EMM Length | (16 bits) |
| Mating Key Generator | (64 bits) |
| Key Identifier #1 | (16 bits) |
| Encrypted Key #1 | (64 bits) |
| ... | |
| Key Identifier #M | (16 bits) |
| Encrypted Key #M | (64 bits) |

| Copy Protection Key Generator Definition{ | |
|---|---|
| STB Manufacturer ID | (8 bits) |
| System ID | (16 bits) |
| Content Provider ID | (16 bits) |
| Reserved | (8 bits) |
| Copy Protection Status | (8 bits) |
| CP Sequence # | (8 bits) |

*Figure 14*

DESCRAMBLER

CROSS-REFERENCE TO RELATED APPLICATIONS

This application is a divisional of U.S. application Ser. No. 10/691,170 filed Oct. 22, 2003, which is a divisional of U.S. application Ser. No. 10/388,002 filed Mar. 12, 2003, which claims the benefit of priority on U.S. Provisional Application No. 60/424,381 filed on Nov. 5, 2002.

BACKGROUND

1. Field

Embodiments of the invention relate to digital devices. More specifically, one embodiment of the invention relates to a system, apparatus and method for descrambling digital content in digital devices such as set-top boxes.

2. General Background

Analog communication systems are rapidly giving way to their digital counterparts. Digital television is currently scheduled to be available nationally. High-definition television (HDTV) broadcasts have already begun in most major cities on a limited basis. Similarly, the explosive growth of the Internet and the World Wide Web have resulted in a correlative growth in the increase of downloadable audio-visual files, such as MP3-formatted audio files, as well as other content.

Simultaneously with, and in part due to this rapid move to digital communications system, there have been significant advances in digital recording devices. Digital versatile disk (DVD) recorders, digital VHS video cassette recorders (D-VHS VCR), CD-ROM recorders (e.g., CD-R and CD-RW), MP3 recording devices, and hard disk-based recording units are but merely representative of the digital recording devices that are capable of producing high quality recordings and copies thereof, without the generational degradation (i.e., increased degradation between successive copies) known in the analog counterparts. The combination of movement towards digital communication systems and digital recording devices poses a concern to content providers such as the motion picture and music industries, who are reluctant in providing downloadable digital content due to fears of unauthorized and uncontrolled copying such digital content.

In response, there is a movement to require content providers, such as terrestrial broadcast, cable and direct broadcast satellite (DBS) companies, and companies having Internet sites which provide downloadable content, to introduce copy protection schemes. These copy protection schemes may extend beyond the role of conditional access (CA), merely descrambling content to a CA-clear format for real-time viewing and/or listening, and now include constraints and conditions on the recording and playback. For example, currently, copying of scrambled content for subsequent descrambling and viewing or listening may be permitted with the appropriate service/content provider authorization or key provided to the digital device.

Traditional CA systems for Pay-TV originated from one-way broadcast systems where a back channel was not available. A cryptographic processor, such as a smart card, in a conditional access unit, such as a set-top box, is generally infused with information and functionality in order to automatically grant access to programs. For example, a smart card with a Pay-TV access control application is adapted to receive messages that grant certain service entitlements. If the set-top box was allowed to view IPPV programs, then credit and cost limit information was transmitted as well. Likewise, when tuning to a program, the smart card received messages that described which entitlements the smart card needed in order to grant access to the program.

Currently, hackers have manipulated both types of messages in order to view programs without paying the requisite subscription fees. Not only can these messages be manipulated, but the hardware can be attacked as well. For instance, descrambling keys in the clear that are used to descramble scrambled content can be copied and sent to other set-top boxes over the Internet. Such hacking is costly to both content providers as well as the content owners.

BRIEF DESCRIPTION OF THE DRAWINGS

Embodiments of the invention are illustrated by way of example and not by way of limitation in the accompanying drawings, in which like references indicate similar elements and in which:

FIG. 9B is an exemplary embodiment of an entitlement management message (EMM) routed to a set-top box of the system of FIG. 9A;

FIG. 14 is an exemplary embodiment of a data structure forming the copy protection key generator of FIG. 12.

DETAILED DESCRIPTION

Various embodiments of the invention relate to an apparatus, system and method for protecting the transfer of data. In one embodiment, such protection involves the descrambling and/or decrypting of digital content from one or more content providers within the digital devices themselves. Examples of a "content provider" include, but are not limited to a terrestrial broadcaster, cable operator, direct broadcast satellite (DBS) company, a company providing content for download via the Internet, or any similar sources of content.

In the following description, certain terminology is used to describe features of the invention. For instance, the terms "component" or "logic" are each representative of hardware and/or software configured to perform one or more functions. Examples of "hardware" include, but are not limited or restricted to an integrated circuit such as a processor (e.g., microprocessor, application specific integrated circuit, a digital signal processor, a micro-controller, etc.), finite state machine, combinatorial logic or the like. The term "process block" represents hardware and/or software having a dedicated function, such as a finite state machine for example.

An example of "software" includes a series of executable instructions in the form of an application, an applet, or even a routine. The software may be stored in any type of machine readable medium such as a programmable electronic circuit, a semiconductor memory device such as volatile memory (e.g., random access memory, etc.) and/or non-volatile memory (e.g., any type of read-only memory "ROM", flash memory), a floppy diskette, an optical disk (e.g., compact disk or digital video disc "DVD"), a hard drive disk, tape, or the like.

Figure 1:
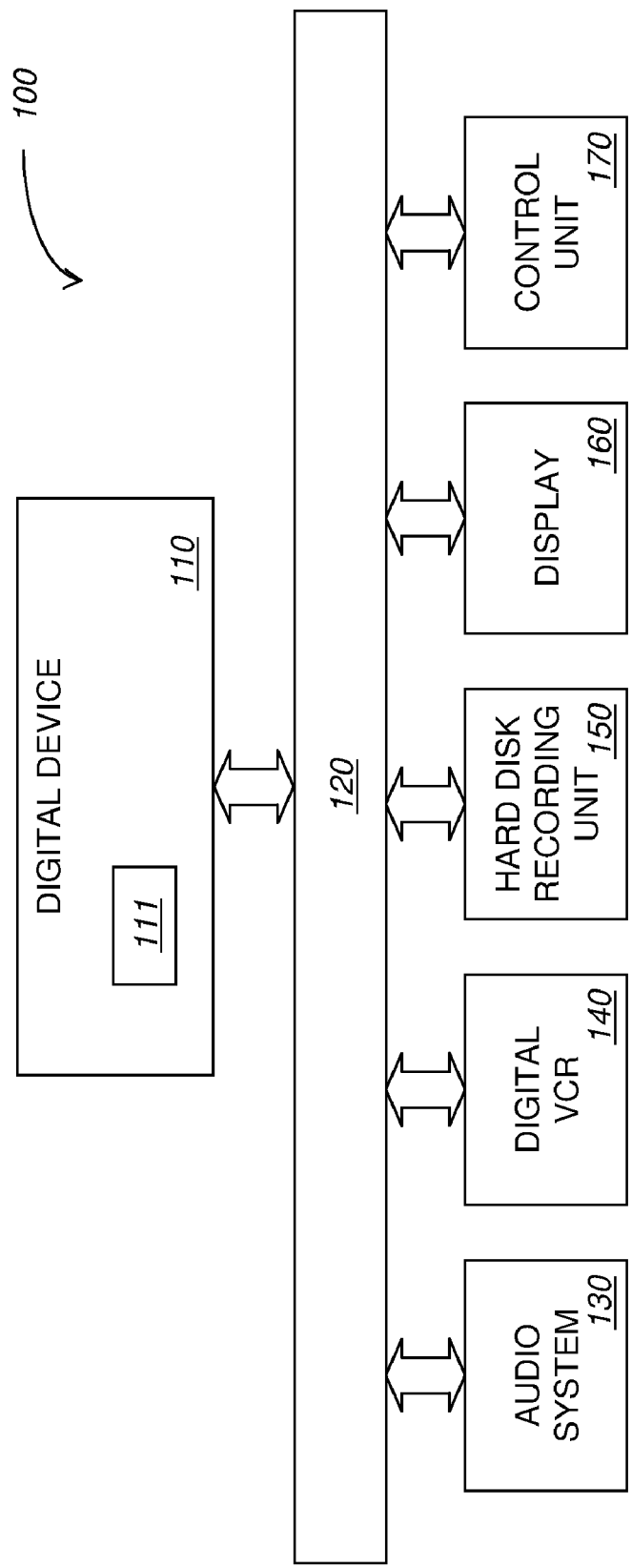
FIG. 1 is an exemplary embodiment of an content delivery system including a digital device.

Referring to FIG. 1, an exemplary embodiment of a content delivery system 100 is shown. Content delivery system 100 includes a digital device 110 that receives information including program data from one or more content providers. The program data may be propagated as a digital bit stream for example. Digital device 110 may operate as any number of products such as a set-top box or one or more components integrated into a television, computer, audio-playback device (e.g., digital radio), audio-recording device (e.g., MP3 player), video-recording device (e.g., digital recorder), or the like.

For instance, digital device 110 may be configured in accordance with an embedded architecture, a split security architecture, or an external security architecture. As an embedded architecture, in one embodiment, digital device 110 is implemented as a set-top box that comprises fixed, internal circuitry supporting both entitlement management and descrambling operations.

Alternatively, in accordance with a split security architecture embodiment, digital device 110 may be adapted to receive a removable smart card that handles entitlement management, while descrambling of digital content is controlled by internal circuitry.

Yet, in accordance with an external security embodiment, digital device 110 may be a "point-of-deployment" product with a network card handling both entitlement management and descrambling operations by sending and receiving messages over an Out-of-Band channel. Of course, external security type may also be split so that the network card handles descrambling operations, but adapted to communicate with a smart card for handling entitlement management. These and other embodiments of digital device 110 may be implemented while still falling within the spirit and scope of the invention.

Digital device 110 comprises a receiver 111, which processes the incoming information, extracts the program data inclusive of the digital content therefrom, and provides the digital content in a perceivable format (e.g., viewable and/or audible). The "program data" comprises any or all of the following: system information, entitlement control message(s), entitlement management message(s), or digital content. The "digital content" in the program data stream may include an image, audio, video or any combination thereof. The content may be in a scrambled or clear format.

Herein, "system information" may include information on program names, time of broadcast, source, and a method of retrieval and decoding, and well as copy management commands that provide digital receivers and other devices with information that will control how and when the digital content may be replayed, retransmitted and/or recorded. These copy management commands may also be transmitted along with an entitlement control message (ECM), which is generally used to regulate access to a particular channel or service. An "Entitlement Management Message" (EMM) may be used to deliver entitlements (sometimes referred to as "privileges") to digital receiver 111. Examples of certain entitlements may include, but are not limited to access rights or descrambling keys. A descrambling key is generally a code that is required by descrambler logic to recover data in the clear from a scrambled format based on the entitlements granted.

As shown, when implemented as a set-top box, digital device 110 may be coupled to other components in content delivery system 100 via a transmission medium 120. The transmission medium 120 operates to transmit program data between digital device 110 and other components in content delivery system 100. The transmission medium 120 may include, but is not limited to electrical wires, optical fiber, cable, a wireless link established by wireless signaling circuitry, or the like.

Depending on the type of product corresponding to the digital device 110, content delivery system 100 may include an audio system 130 coupled to the transmission medium 120. A digital VCR 140, such as a D-VHS VCR, may also be coupled to the digital device 110 and other components of the content delivery system 100 through the transmission medium 120.

A hard disk recording unit 150 may also be coupled to digital device 110 and other components via transmission medium 120. Display 160 may include a high definition television display, a monitor, or another device capable of processing digital video signals. Finally, a control unit 170 may be coupled to the transmission medium 120. Control unit 170 may be used to coordinate and control the operation of some or each of the components on content delivery system 100.

The digital content of the program data may be transmitted in scrambled form. In one embodiment, as part of the program data, access requirements may be transmitted along with the scrambled content to digital device 110 (e.g., set-top box) that is implemented with receiver 111 thereby functioning as a conditional access unit. An "access requirement" is a restrictive parameter used to determine if digital device 110 implemented with conditional access functionality, hereinafter referred to herein as the "conditional access unit 110," is authorized to descramble the scrambled content for viewing or listening purposes. For example, the access requirement may be a key needed to perceive (view and/or listen to) the content, a service tag associated with a given content provider, or even a particular descrambling software code.

When a scrambled program is received by conditional access unit 110, the access requirements for the program are compared to the entitlements that the conditional access unit 110 actually has. In order for the conditional access unit 110 to display the scrambled content in clear form, in one embodiment, the access requirements associated with the digital content are compared to the entitlements of the conditional access unit 110. The entitlements may state that conditional access unit 110 is entitled to view/playback content from a given content provider such as Home Box Office (HBO), for example. The entitlements may also include one or more keys needed to descramble the digital content. The entitlements also may define the time periods for which conditional access unit 110 may descramble the digital content.

Thus, in one embodiment, access requirements and entitlements form a part of the access control system to determine whether a conditional access unit or even a decoder is authorized to view a particular program. It is contemplated that the description below focuses on mechanisms to recover audio/visual content such as television broadcasts, purchased movies and the like. However, it is contemplated that the invention is also applicable to the descrambling of audible content only (e.g., digitized music files).

The access requirements and entitlements can provide consumers with a variety of choices for paying for the content and gaining access to the scrambled content. These choices may include pay per play (PPP), pay per view (PPV), impulse pay per view (IPPV), time based historical, pay per time (PPT). "Impulse pay per view" is a feature which allows purchase of PPV movies through credit that has been previously downloaded into the set-top box. Purchase records may be stored and forwarded by phone to a billing center. "Time based historical" allows access to content that was delivered during a past time period, such as March through December, 1997, for example. The access requirements and entitlements can also provide consumers with different options for storing the scrambled content.

The access requirements may be delivered to the conditional access unit, located within digital device 110 or coupled thereto over transmission medium 120, using packet identifiers (PIDs). Each PID may contain the access requirements associated with a given service. The content that is delivered to the conditional access unit may also include a large number of PIDs, thus enabling special revenue features, technical features, or other special features to be performed locally.

Before receiving the content, the customer may be given a number of choices for gaining access to the digital content that is going to be stored to media. The customer may be required to purchase the right to access and view the content. Therefore, if the customer wants to record the content for later retrieval and viewing, the access requirements that the customer bought also need to be stored with the digital content.

Figure 12:
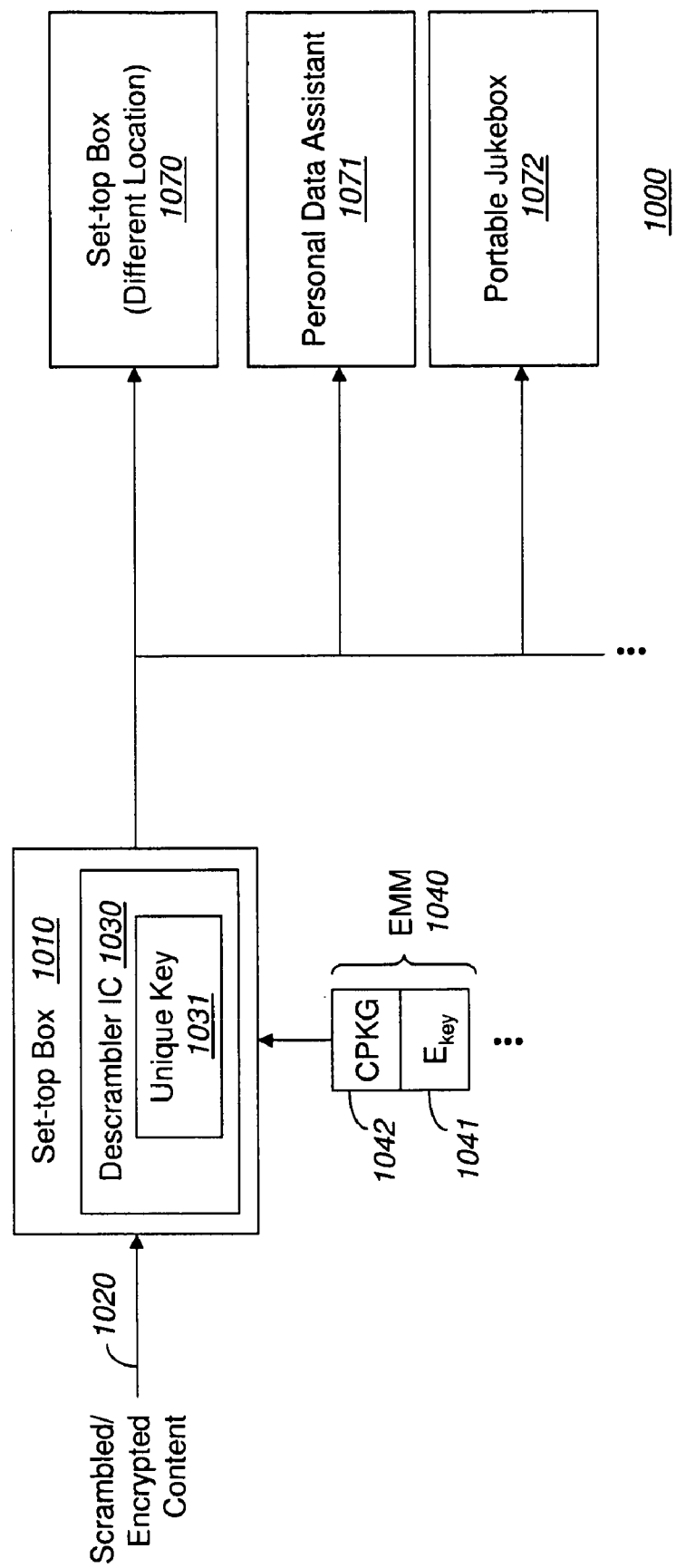
FIG. 12 is an exemplary embodiment of a portion of a seventh exemplary embodiment of a secure content delivery system in which the digital device is adapted with copy protection functionality.
Figure 13:
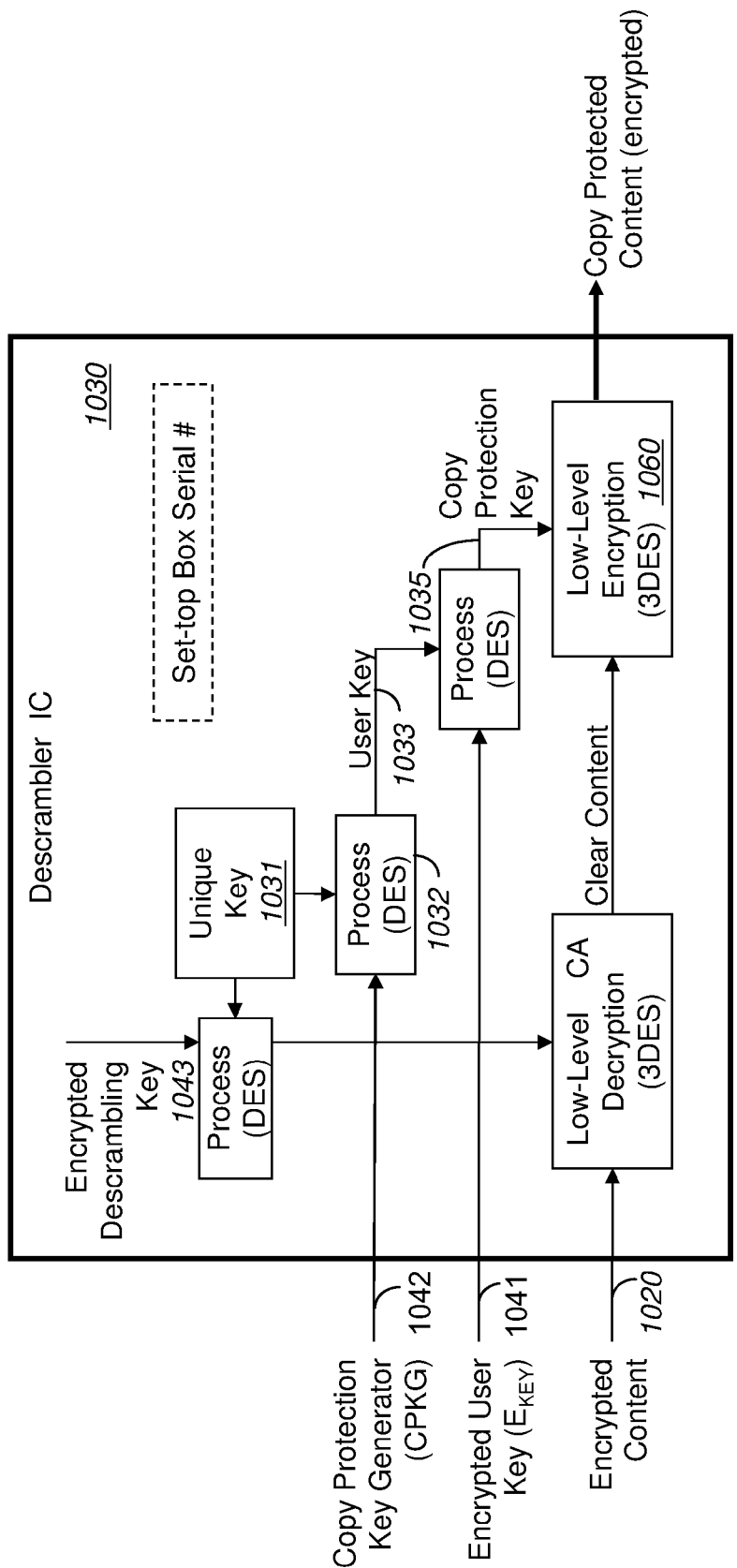
FIG. 13 is an exemplary embodiment of the decoder implemented within the digital device of FIG. 12.
Figure 13:
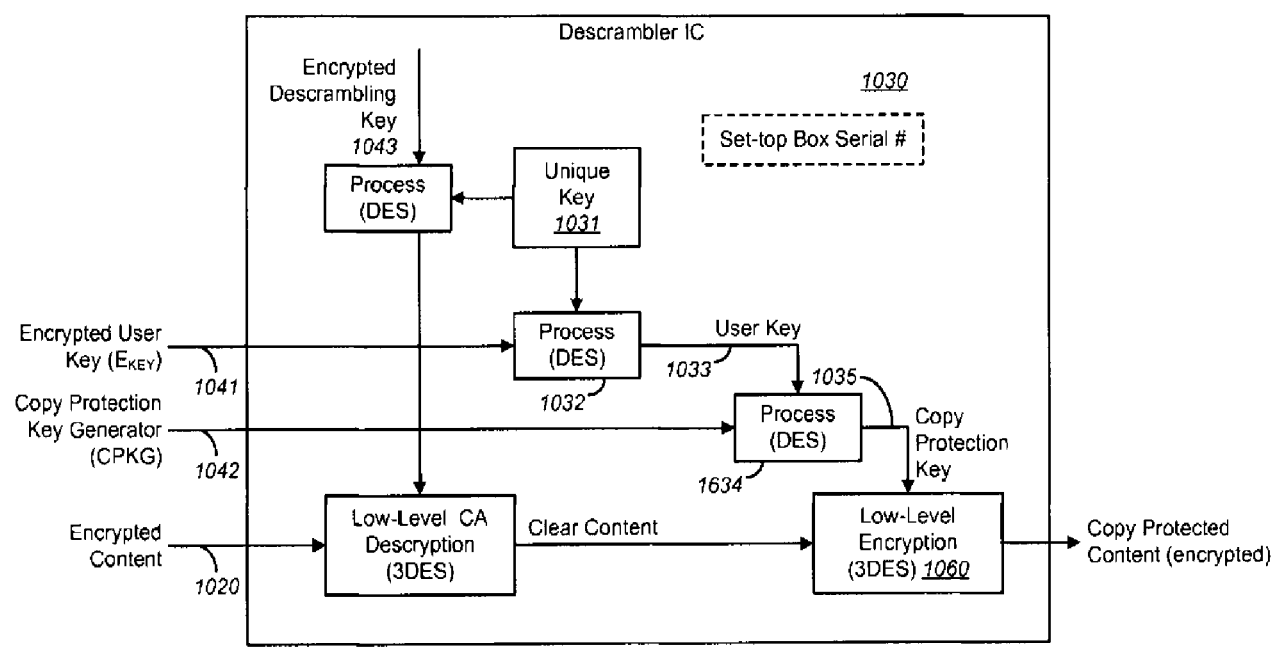

In addition, there may be copy-protection applied to the descrambled digital content (e.g., transport stream) as shown in FIGS. 12 and 13. Copy-protected digital content will be re-scrambled across an interface interconnecting a destination interface and a source. The source and destination interface need to agree on the key used to re-encrypt this content. This copy protection key can be encrypted with the unique key associated with the digital device. The unique key can be received through an EMM or other method, e.g. factory load procedure.

Figure 2:
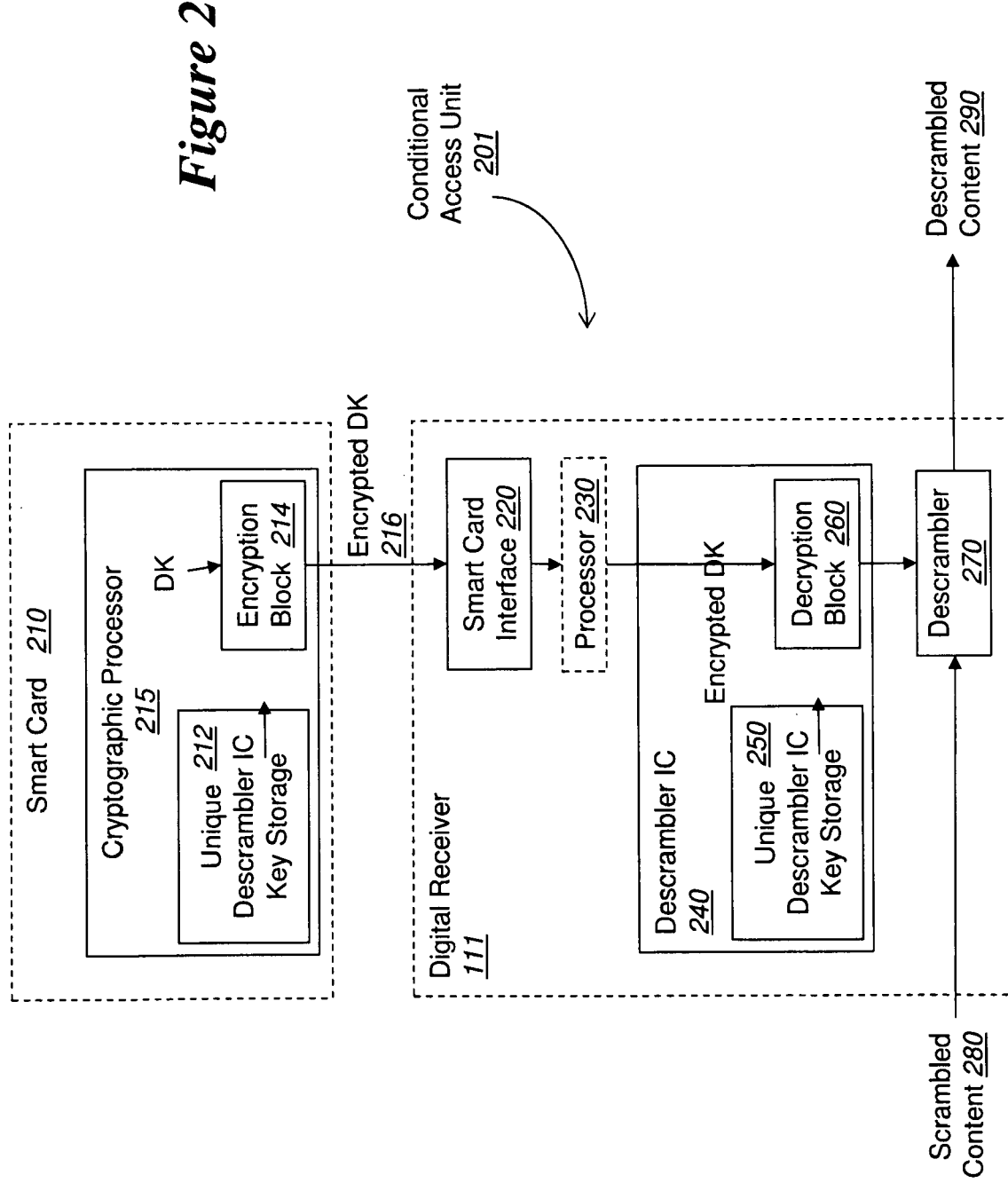
FIG. 2 is a first exemplary embodiment of a secure content delivery system that comprises the conditional access unit adapted to operate with a smart card.

As seen in FIG. 2, a first exemplary embodiment of a secure content delivery system that comprises a conditional access unit 201 adapted to operate with a smart card interface 220 is shown. This embodiment is consistent with a split security architecture and an external security architecture. In a split security architecture implementation, digital device 110 operates as a conditional access unit 201 (e.g., equivalent to conditional access unit 110 of FIG. 1), but is implemented as a set-top box or other type of digital device.

Although smart card interface 220 may be built into digital receiver 111, it is expected that digital receiver 111 will have an expansion slot, such as a PCMCIA slot or Universal Serial Bus (USB) slot for example, to receive a card 210 complementary to interface 220. For this embodiment, digital receiver 111 comprises an optional processor 230 and a descrambler integrated circuit (IC) 240.

Smart card interface 220 is adapted for attachment to smart card 210, which stores one or more encrypted descrambling keys for descrambling incoming digital content. Smart card 210 transmits the descrambling key(s) in encrypted form to smart card interface 220. In order to protect the descrambling key(s), generally referred to as "DK," from being improperly extracted by an interloper monitoring communications between smart card 210 and smart card interface 220, smart card 210 may use an encryption key unique to conditional access unit 201 to encrypt the DK. This allows conditional access unit 201 to decrypt the DK in a secure manner and use the DK in a clear format to descramble the digital content.

More specifically, according to one embodiment of the invention, an external cryptographic processor 215 of smart card 210, receives the DK needed to descramble content. A storage element 212 (e.g., volatile or non-volatile memory) is previously loaded with one or more keys for encrypting the DK. Such loading may be performed during manufacture of smart card 210, during manufacture of storage element 212 or by cryptographic processor 215 when storage element 212 is on-chip. Encryption logic 214 of smart card 210 encrypts the DK with the one or more keys that are unique to descrambler IC 240.

For this embodiment, smart card 210 delivers the encrypted DK 216 to descrambler IC 240. Herein, processor 230 receives encrypted DK 216 through interface 220, although encrypted DK 216 may be sent directly to decryption logic 260. Processor 230 may be implemented to perform additional operations to counteract additional obfuscation techniques performed on the DK.

Decryption logic 260 of the descrambler IC 240 will decrypt the DK using one or more unique keys stored in a storage element 250. In one embodiment, storage element 250 comprises one or more key registers loaded at manufacturer or after implemented within conditional access unit 201 through initial program data transmitted to conditional access unit 201. Decryption logic 260 then writes the decrypted DK alternately into ODD and EVEN key storage elements (not shown) of descrambler logic 270. Descrambler logic 270 then applies the ODD/EVEN DK to the incoming scrambled content 280 at the right time and outputs descrambled program content 290. Of course, alternatives to the loading of ODD and EVEN key storage elements may be utilized for descrambling of incoming scrambled content 280.

Thus, the transfer of the descrambling key from smart card 210 to conditional access unit 201 is secure, because the descrambling key is transferred in encrypted form. The descrambling key remains secure in conditional access unit 201 because the descrambling key is not decrypted by non-secure processor 230. The descrambling key is only decrypted in descrambler IC 240 that actually uses the descrambling key, and thus, the descrambling key is never exposed in the clear, and cannot be obtained by hackers.

Furthermore, the key used to decrypt the encrypted DK 216 is stored in hardware (e.g., storage element 250) of descrambler IC 240. Storage element 250 cannot be hacked unless the silicon of storage element 250 is probed. Furthermore, the key may only be valid for one particular conditional access unit 201, and may not be used by other units to decrypt the encrypted DK 216, because the DK is encrypted by smart card 210 using a key that is unique to an associated conditional access unit 201. Therefore, the transmission of the encrypted DK 216 to conditional access unit 201 is secure.

Descrambler IC 240 handles the secure processing of the descrambling keys. This descrambler IC 240 has no CPU, no firmware, and no software. There is no complicated key hierarchy. A non-processor based descrambler IC 240 receives encrypted DK 216, applies a unique key to it, and decrypts it. No instructions, no code, no hashing, and no software is loaded into decryption logic 260. The decryption is performed entirely by decryption logic 260 being a hardware circuit or state machine using only a single key function.

One or more unique keys, generally referred to herein as "Unique Key," may be programmed into storage element 250 during manufacture or during implementation within a set-top box, television, or NRSS-B module. For example, in one embodiment, descrambler IC 240 is implemented with a programmable non-volatile storage element 250 such as flash. In another embodiment, descrambler IC 240 is implemented with non-programmable, non-volatile memory that can be written only once in order to enhance security. As a result, there is no way to either improperly read or overwrite the Unique Key that is originally loaded into storage element 250. An association between the serial number of conditional access unit 201 and the Unique Key loaded into descrambler IC 240 of the conditional access unit 201 may be recorded.

When conditional access unit 201 is manufactured and a smart card 210 is installed, smart card 210 can receive the Unique Key associated with conditional access unit 201 at the time of pairing. From then on, smart card 210 is "paired" to that particular host (e.g., conditional access unit 201). Later, if smart card 210 is ever replaced or moved to a new host, smart card 210 may be adapted to receive a unique key associated with the new host via an Entitlement Management Message (EMM). Of course, as an alternative, a new smart card with a newly programmed unique key may also be delivered to the user.

Figure 3:
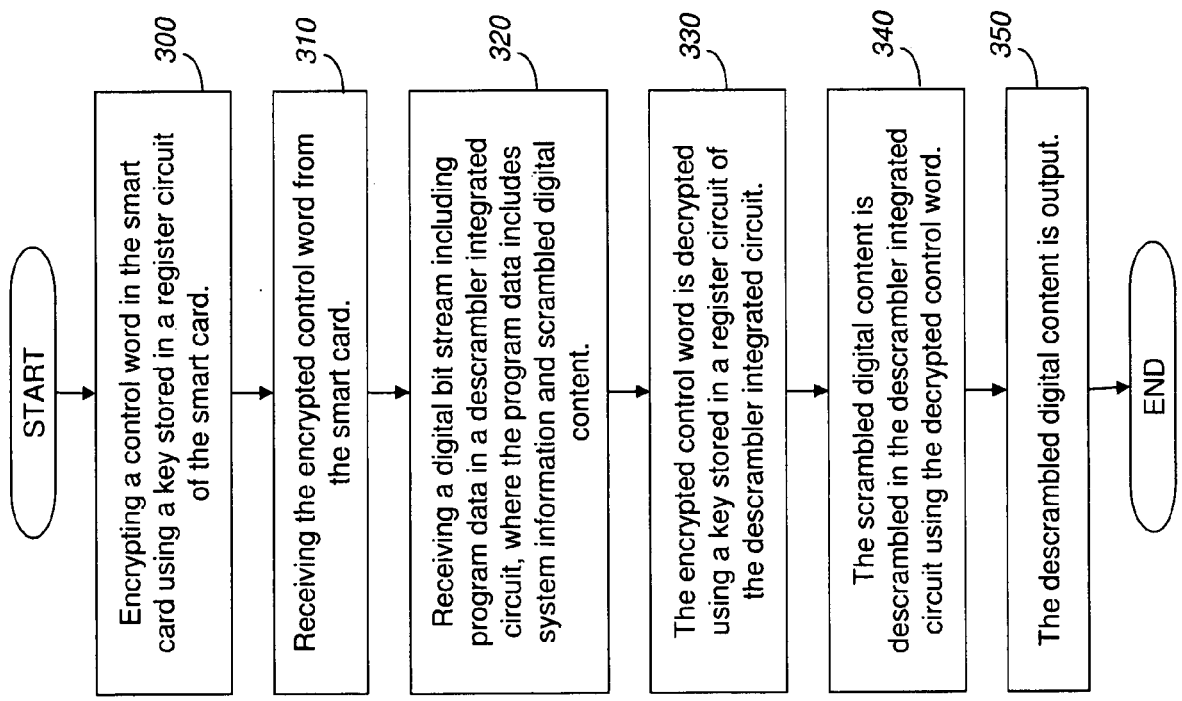
FIG. 3 is an exemplary embodiment of a method for securely transferring descrambling keys from the smart card to the conditional access unit of FIG. 2.

An exemplary method for transferring a descrambling key from smart card 210 to conditional access unit 201 of FIG. 2 is shown in FIG. 3. A descrambling key is encrypted in the smart card using a key stored in non-volatile memory of the smart card (block 300). This key ("Unique Key") stored in the smart card is associated with the key stored in the storage element of the descrambler IC. The encrypted descrambling key is received from the smart card (block 310).

This method includes receiving a digital bitstream including program data in a descrambler IC, where the program data includes system information and scrambled digital content (block 320). The encrypted descrambling key is decrypted using a key stored in a storage element of the descrambler IC (block 330). The scrambled digital content is descrambled in the descrambler IC using the decrypted descrambling key (block 340), and the descrambled digital content is output (block 350).

Figure 4:
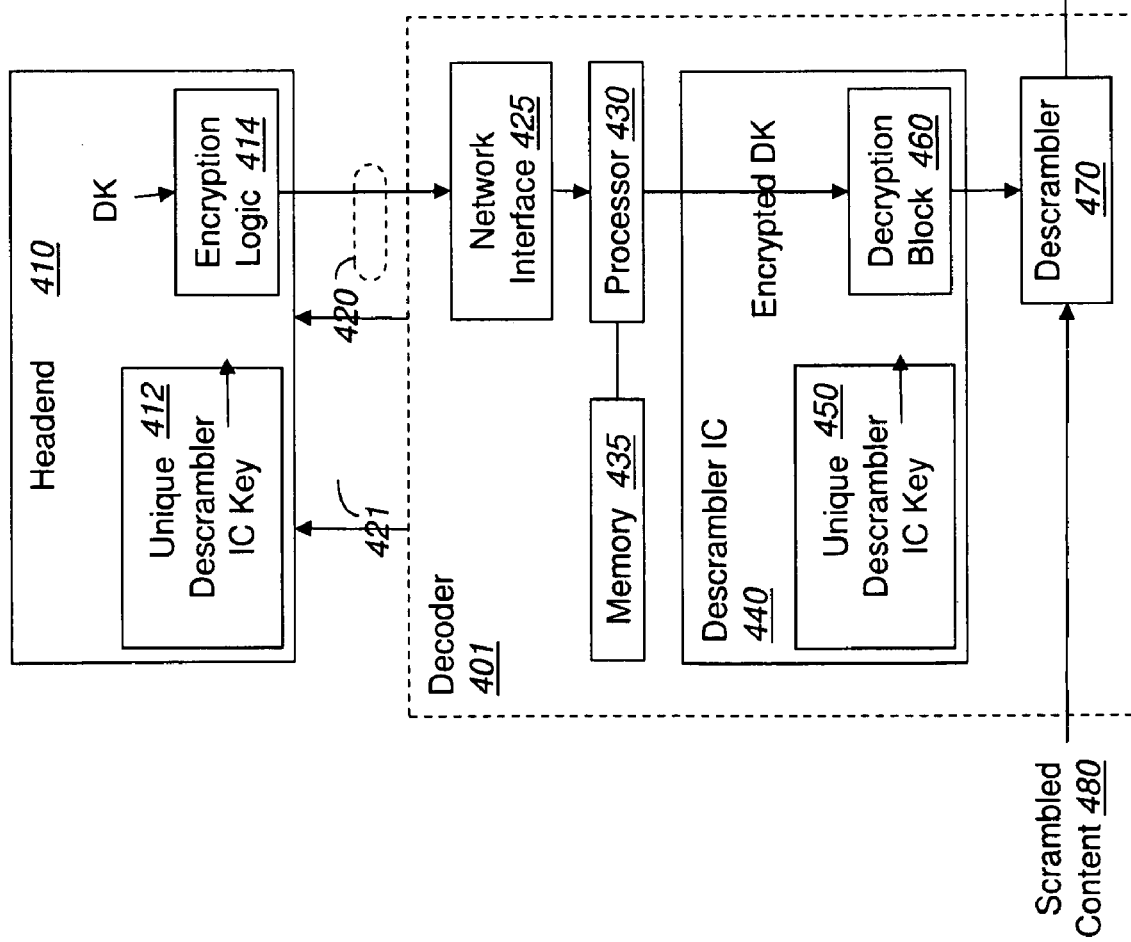
FIG. 4 is a second exemplary embodiment of a secure content delivery system that comprises a decoder adapted to a headend via a network connection.

As an alternative embodiment to the conditional access unit implementation of FIG. 2, the smart card may be replaced by a headend server ("headend") 410 of a one-way or two-way network 420 as shown in FIG. 4. Headend 410 maintains the access rights for the digital device operating as a decoder (referred to as "decoder 401"), instead of maintaining such access rights in a local cryptographic processor 215 of smart card 210 of FIG. 2.

Headend 410 can deliver one or more service keys (generally referred to as "Service Key") based on the Unique Key stored in Descrambler IC 440. The encrypted Service Key may be stored locally in decoder 401 to facilitate transitions from one channel to another. The Service Key are stored in encrypted form, and is loaded as needed into Descrambler IC 440. The Service Key is decrypted within Descrambler IC 440, by using the Unique Key stored in a storage element 450 of Descrambler IC 440.

In one embodiment of the invention, the Service Key is used as a descrambling key to descramble the content directly. In another embodiment of the invention, the Service Key is used to decrypt one or more descrambling keys, which are received in-band with the scrambled content and subsequently used for descrambling purposes. Each service key may be encrypted using different public and proprietary encryption algorithms. These different proprietary algorithms may be considered as any-piracy measures to invalidate clone hardware.

Headend 410 can deliver the Service Key on a channel or "tier of service" basis in the EMMs. The service keys are encrypted, stored locally in decoder 401, and used by a processor 430 as needed when tuning to different channels. While this embodiment works in one-way (non-IPPV) broadcast networks, it also performs in two-way, interactive networks, where the Service Key for a particular service is requested, such as IPPV or VOD purchases or any other non-subscription service. A return channel 421 is used to request the Service Key because the ability to grant access to a new service is performed by headend 410 instead of a local controlling cryptographic processor.

In order to avoid overload problems at headend 410 caused by a large number of simultaneous impulse buys of IPPV programs, a Free Preview period can be determined and IPPV programs can be marketed in advance of the actual viewing. In this embodiment, service keys for individual shows or movies may be requested by decoder 401 and delivered ahead of time. For example, interactive networks, such as a cable system having return channel 421 such as a DOCSIS modem or Out-of-Band transmitter/receiver for example, can deliver a Request for Program Key (RPK) message from decoder 401 to headend 410. Alternatively, decoder 401 may request the Service Key in real-time for each program accessed.

A controller (not shown) on headend 410 processes the RPK message. The RPK message may contain an address of decoder 401 as well as information needed to identify the channel to be viewed (all of which may be obtained from Motion Picture Experts Group "MPEG" system and program information already processed by the insecure processor). The RPK request may be encrypted, if desired, for non-repudiation and prevention of denial of service attacks, such as IPPV or VOD requests for example.

Upon receipt of the RPK message, headend 410 accesses entries of an access control list (listing each entitlement of decoder 401) and verifies decoder 401 is authorization to receive a particular Service Key. If authorized, headend 410 sends the Service Key (encrypted using the Unique Key contained in storage element 450 located in the descrambler IC) to decoder 401.

Figure 5:
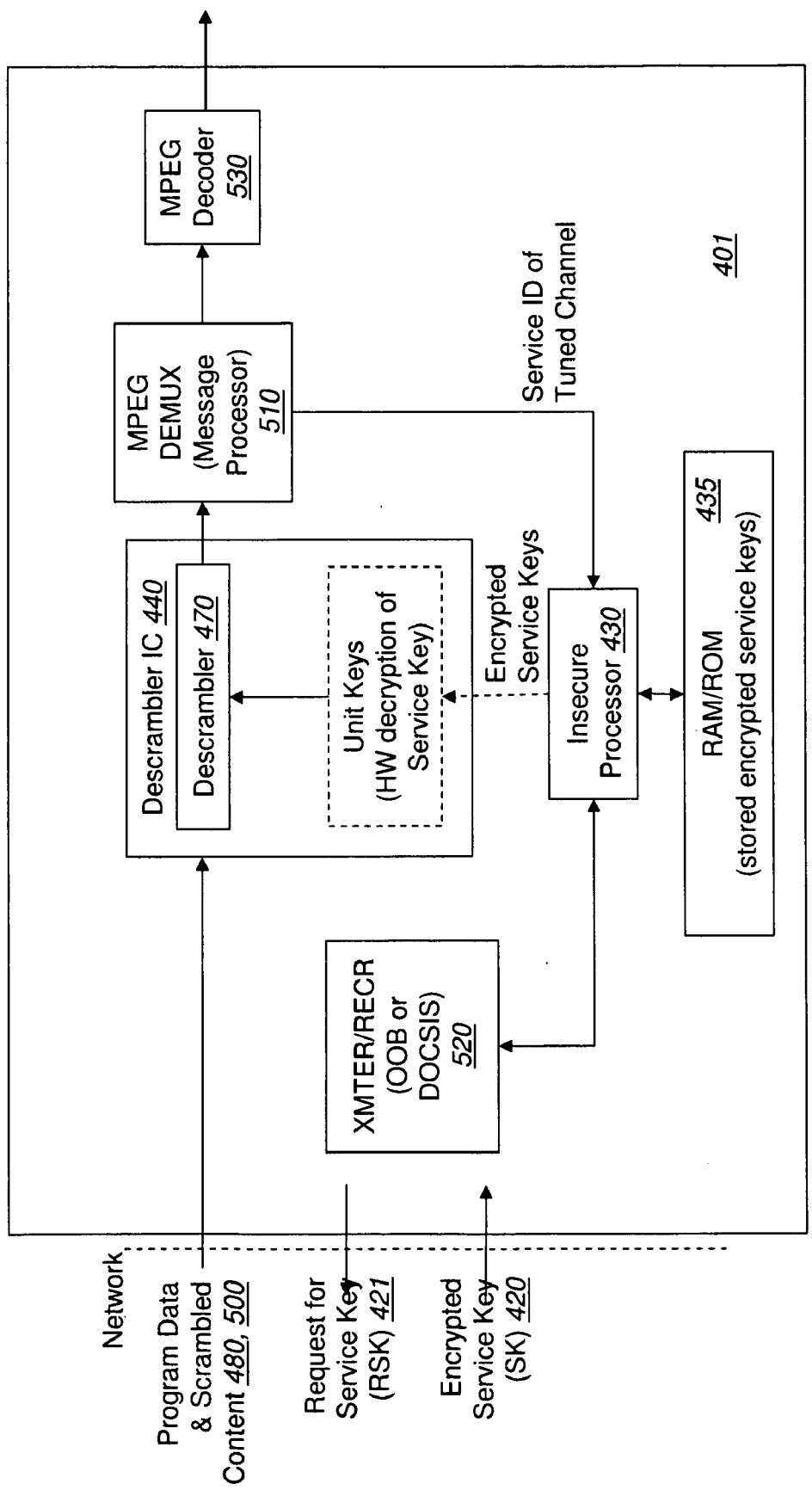
FIG. 5 is a more detailed illustration of the decoder adapted to the headend of FIG. 4.

FIG. 5 provides a more detailed illustration of decoder 401 of FIG. 4 adapter to headend 410 for request and receipt of the Service Key. According to one embodiment of the invention, program data 500 such as an Entitlement Control Message (ECM) or meta-data associated with an Electronic Program Guide (EPG) is provided to decoder 401 by a content provider. The program data 500 is adapted to convey at least an identifier of the desired channel or service (referred to as "Channel or Service ID"). In the event that program data 500 is an IPPV or VOD program, program data 500 may further include a Program identifier (PID).

An MPEG Demultiplexer 510 operates as a message processor to extract the Channel or Service ID. The Channel or Service ID are routed to processor 430, which in combination with transmitter/receiver logic 520 generates the RSK message 421 for routing to headend 410 over return channel 421.

In response, the requested Service Key (SK) in an encrypted format is received by the transmitter/receiver logic 520, which provides the SK to processor 430. Processor 430 may store the SK in a memory 435 and/or provide the SK to descrambler IC 440 for descrambling incoming scrambled content in real-time. For instance, memory 435 is an optional component for use if it is desirable to storage the SK locally.

Upon receiving the scrambled content of the program data, descrambler IC 440 descrambles such content, which is subsequently supplied to MPEG decoder 530 if the content is compressed with a MPEG format. MPEG decoder 530 decompresses the digital content and subsequently routes the decompressed digital content to either a digital-to-analog (D/A) converter for display on a television, a Digital Video Interface (DVI) link or a network interface (e.g., IEEE 1394 link).

As shown, processor 430, memory 435, descrambler IC 440, MPEG Demultiplexer 510, transmitter/receiver logic 520 and MPEG decoder 530 may be implemented on two or more integrated circuits interconnected through bus traces or another communication scheme (e.g., wires, optical fiber, etc.). Alternatively, these components may be implemented on a single integrated circuit.

In this embodiment, the SK may be valid for a certain period of time. Decoder 401 may store the SK in memory 435, allowing decoder 401 to re-access the service with if SK is still valid without having to request that Service Key again. In this embodiment, the SK is stored in encrypted form (as it comes over the network from headend 410) in memory 435.

The SK may be valid for the duration of a program or it may be valid for a selected period of time, e.g. 6 hours. Using a key for a longer period of time will reduce the overall number of transactions between decoder 401 and headend 410 because, once SK is stored in memory 435 of decoder 401, it is readily available. Depending on the duration of the current Service Key (e.g., SK), the next Service Key ($SK_{next}$) may be delivered along with the SK. Alternatively, decoder 401 may request the $SK_{next}$ after detecting the end of the SK's valid Epoch (e.g., time duration of the SK). In different embodiments, the Service Key may be valid for a duration of a user's subscription period.

Services can be sold a-la-carte or sold as a package. There may be several tiers of services, each identified by a Service ID. For example, there may be a basic tier of services, a medium tier offering more services, and advanced tiers offering different premium services. Each incremental tier of services may be given a separate Service Key.

In summary, decoder 401 of FIG. 4 comprises a Descrambler IC 240 with a Unique Key loaded during IC manufacturer or creation of decoder. Service Keys are delivered to decoder 401 encrypted by the Unique Key and stored in encrypted form in decoder 401. Alternatively, decoder 401 could request a Service Key each time that decoder 401 tunes to a channel without storing the Service Key(s} locally.

The entitlements normally held by the secure cryptographic processor of FIG. 2 are held by the controlling authority such as a key server in headend 410 of FIG. 4 for example. Processor 430 in decoder 401 may receive a message (e.g., an ECM or an EMM), which tells it what it is authorized to descramble so that it may properly display viewing options to a viewer. Processor 430 can then request Service Keys for selected channels.

There is no embedded "secure" firmware or software. Using the hardware decryption circuit mentioned above, an embedded processor core or firmware that performs a cryptographic function is not needed. This enables a number of conditional access applications, which may be downloaded to the insecure processor. The Service Key is unit key encrypted. It may be a public asymmetric key or secret symmetric key.

Additional advantages include Pay-TV applications without using a cryptographic processor by providing decoder 401 having Descrambler IC 440 with Unique Keys hardwired therein. Decoder 401 can request a Service Key or Descrambling key from a network provider. Local access control can be performed by processor 430 because the critical "secure" function is isolated in Descrambler IC 440.

Figure 6A:
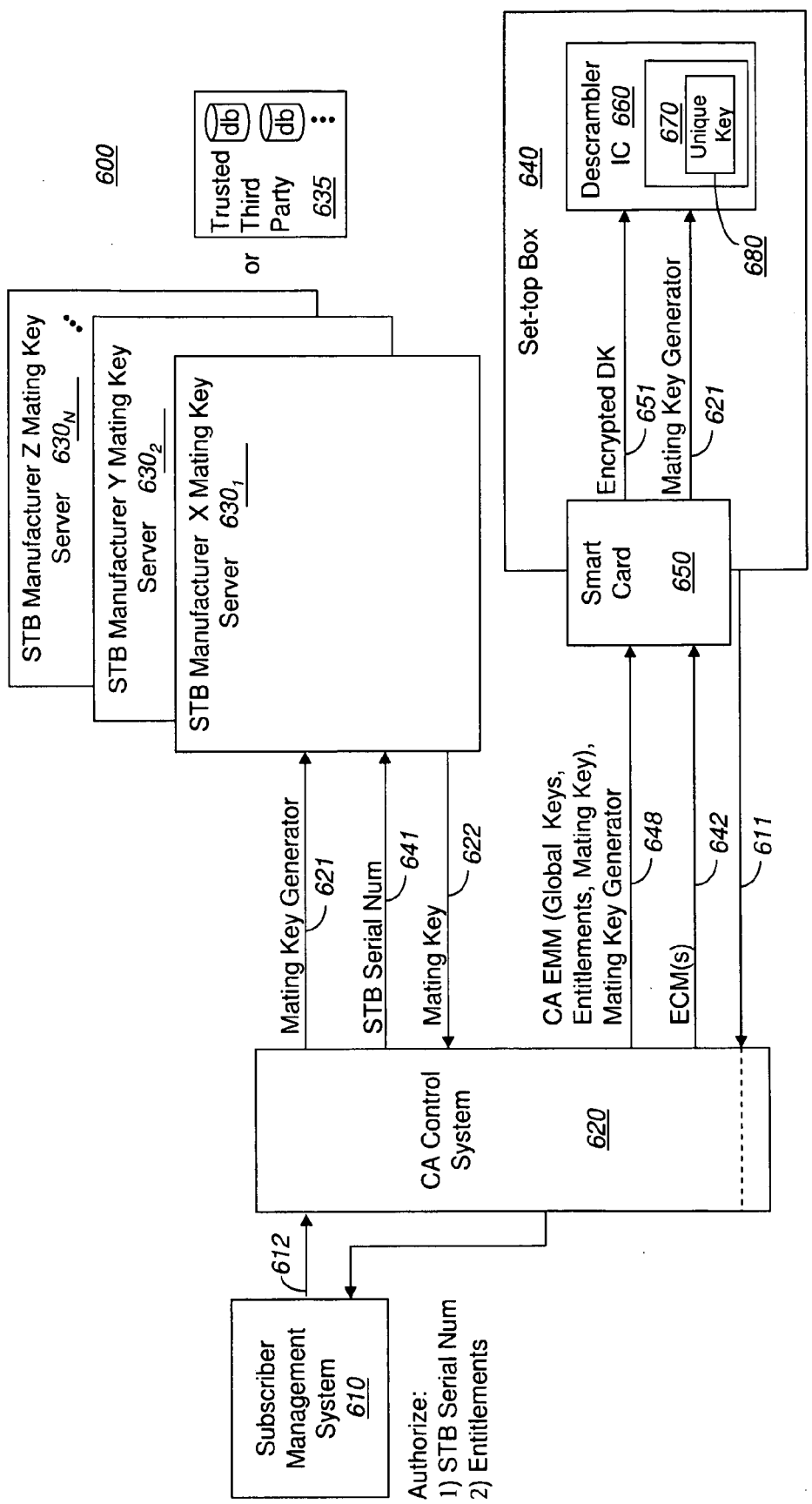
FIG. 6A is a third exemplary embodiment of a secure content delivery system.

Referring now to FIG. 6A, a third exemplary embodiment of a secure content delivery system 600 is shown. Secure content delivery system 600 comprises a subscriber management system 610, a Conditional Access (CA) control system 620, a plurality of mating key servers associated with different set-top box manufacturers $630_1$-$630_N$ ($N \geq 2$) and a set-top box 640 adapted to receive a smart card 650. Smart card 650 communicates with a descrambler IC 660, which includes local memory 670 configured to store a unique key (referred as "Unique Key") 680 of set-top box 640. Unique Key 680 is loaded during IC manufacturer or creation of set-top box 640.

Once a user of set-top box 640 desires to receive particular program data, set-top box 640 determines whether entitlements associated with the requested program data are already stored therein. If the entitlements are not stored, the user may be notified by a screen display and prompted to issue a request 611. Request 611 may be provided by the user via (i) an out-of-band communication pathway (e.g., electronic mail over the Internet, telephone call by the user, etc.) or (ii) an in-band communication pathway to CA control system 620 in communication with set-top box 640 as shown. Alternatively, request 611 may be sent automatically or may be routed to CA control system 620 which performs a lookup of information to authorize the user substantially in real time.

For one embodiment, request 611 is a message that comprises an identifier (e.g., an alphanumeric, or numeric code) of the requested content, a serial number of set-top box (referred to as "STB Serial Num") and/or an identifier of smart card 650 (referred to as "Smart Card ID"). Implemented as any information processing system (e.g., server, relay station or other equipment controlled by a service provider or content provider), subscriber management system 610 processes request 611 and determines what entitlements are to be provided to set-top box 640. Although not shown, it is contemplated that CA control system 620 could be configured to perform a lookup of databases containing serial numbers of set-top boxes or smart card IDs, thereby eliminating access to subscriber management system 610.

Upon receiving an authorization (AUTH) message 612 from subscriber management system 610, which may include the STB Serial Num and perhaps global keys (e.g., keys used to decrypt ECMs sent in-band with the content), CA control system 620 routes STB Serial Num 641 and a mating key generator 621 to at least one of the mating key servers $630_1$, ..., or $630_N$ (generally referred to as "mating key server $630_i$," where $i \geq 1$). CA control system 620 operates as an intermediary to coordinate delivery of a mating key 622 that is used to recover digital content from downloaded, scrambled content. CA control system 620 may be implemented as a headend, a broadcast station, a satellite uplink or the like.

Alternatively, instead of CA control system 620 routing mating key generator 621 and STB Serial Num 641 to a mating key servers $630_1$-$630_N$, it is contemplated that such information may be sent to a trusted third party 635, which maintains and controls access to databases featuring mating keys. The values associated with mating key generator 621 and/or STB Serial Num 641 are used to retrieve mating key 622. "Trusted third party" 635 may include, but is not limited or restricted to a governmental entity, a company independently managed from any manufacturer, or the like.

Prior to transmission of STB Serial Num 641 and mating key generator 621, CA control system 620 may perform an authentication scheme with a selected mating key server, such as server 630$_1$, in order to establish a session key between CA control system 620 and mating key server 630$_1$. Of course, the authentication scheme would be performed with trusted third party 635 if implemented in lieu of mating key server 630$_1$. The session key can be used to encrypt information exchanged between the parties in order to provide a secure link there between. Examples of various types of authentication schemes include an exchange of digital certificates, digital signatures, hash values or the like.

Figure 6B:
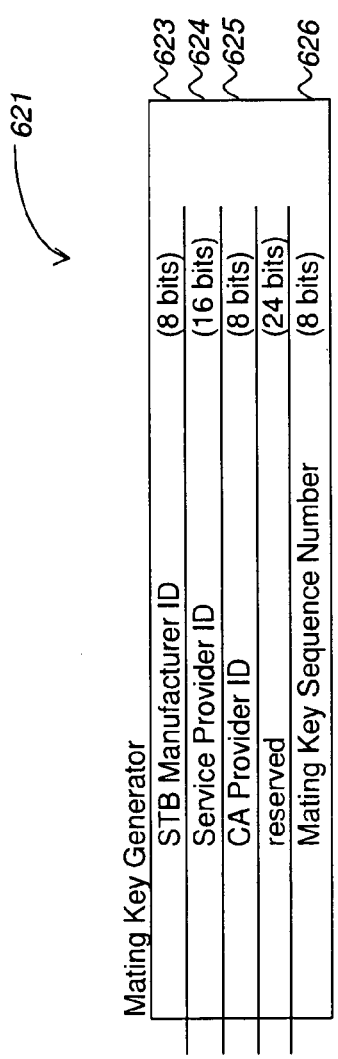
FIG. 6B is an exemplary embodiment of a data structure forming the mating key generator transmitted through a secure content delivery system.

As shown in FIG. 6B, mating key generator 621 is a message that comprises one or more of the following: a Set-Top-Box Manufacturer identifier (STB Manufacturer ID) 623, a Service Provider ID 624, a conditional access (CA) Provider ID 625 and a Mating Key Sequence Number 626. Of course, the size (in bits) of these values/fields can be varied.

For this embodiment, "STB manufacturer ID" 623 is a predetermined value that identifies a manufacturer of set-top box 640. Of course, it is contemplated that STB manufacturer ID 623 is optional, depending on the particular arrangement of STB Serial Num 641. "Service Provider ID" 624 is a value (e.g., one or more bits such as 16-bits) that identifies the communications system provider as well as the selected distribution mechanism. For example, Service Provider ID 624 may identify which cable, satellite, terrestrial or Internet company is supplying the requested program data and/or the particular head-end server of that company. "CA Provider ID" 625 indicates the provider of CA control system 620. "Mating Key Sequence Number" 626 is used for reordering packets of information if mating key 622 is more than one packet in length, and in certain systems, may also be used to indicate expiration of mating key generator 621.

Referring back to FIG. 6A, STB Serial Num 641 may have a unique portion for each STB Manufacturer ID 623 in order to identify mating key server 630$_1$, . . . , or 630$_N$ (or database of trusted third party 635) to which access is sought. Alternatively, STB Serial Num 641 may be expanded to include a serial number of set-top box 640 as well as a code field to identify the manufacturer of that set-top box 640. Of course, the number of bits is a design choice.

Upon receipt of mating key generator 621 and STB Serial Num 641, the appropriate mating key server (e.g., server 630$_i$, where i≧1) returns mating key 622. In this embodiment, mating key 622 is used to encrypt a descrambling key needed to descramble scrambled content being sent to set-top box 640. More specifically, mating key server 630$_i$ accesses a pre-stored key being an identical copy of Unique Key 680 and encrypts mating key generator 621 using the accessed key. This produces a key equivalent to mating key 622. Alternatively, it is contemplated that mating key generator 621 may undergo a one-way hash operation in which the result is encrypted or only a portion of mating key generator 621 may be encrypted to produce mating key 622. A similar operation needs to be repeated, however, within descrambler IC 660.

Upon receipt of mating key 622, CA control system 620 generates an entitlement management message (EMM) 648 along with one or more ECMs 642 sent to smart card 640. One embodiment of EMM 648 is illustrated in FIG. 6C.

Figure 6C:
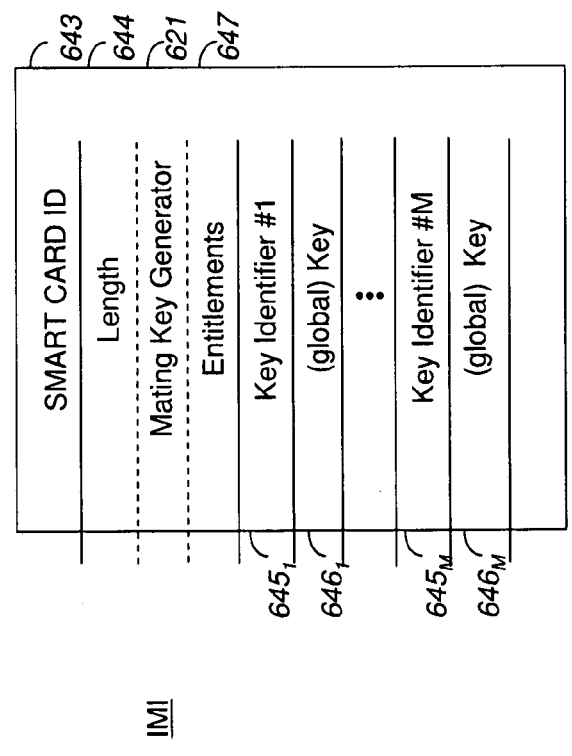
FIG. 6C is an exemplary embodiment of an entitlement management message (EMM) routed to a set-top box of the system of FIG. 6A.

As shown in FIG. 6C, EMM 648 comprises at least two of the following: Smart Card ID 643, length field 644, mating key generator 621, "M" (M≧1) key identifiers 645$_1$-645$_M$ and keys 646$_1$-646$_M$ associated with key identifiers 645$_1$-645$_M$, respectively. Of course, other entitlements 647 may be included in EMM 648. Also, it is contemplated that mating key generator 621 may be excluded from EMM 648 and sent separately and generally concurrent with EMM 648.

In particular, with respect to FIG. 6C, smart Card ID 643 is a bit value that is used to indicate a particular set-top box and perhaps the manufacturer of the set-top box. "EMM length field" 644 is a bit value that is used to indicate the length of EMM 648. Mating key generator 621, as shown, is a bit value that includes the parameters forth above in FIG. 6B. Each "key identifier" 645$_1$-645$_M$ is a 16-bit entitlement tag value that is signed for use in checking whether keys 646$_1$-646$_M$ have been illicitly altered. Keys 646$_1$-646$_M$ are used to decrypt ECMs 642 used to deliver access requirements and at least one descrambling key in an encrypted format.

Figure 7A:
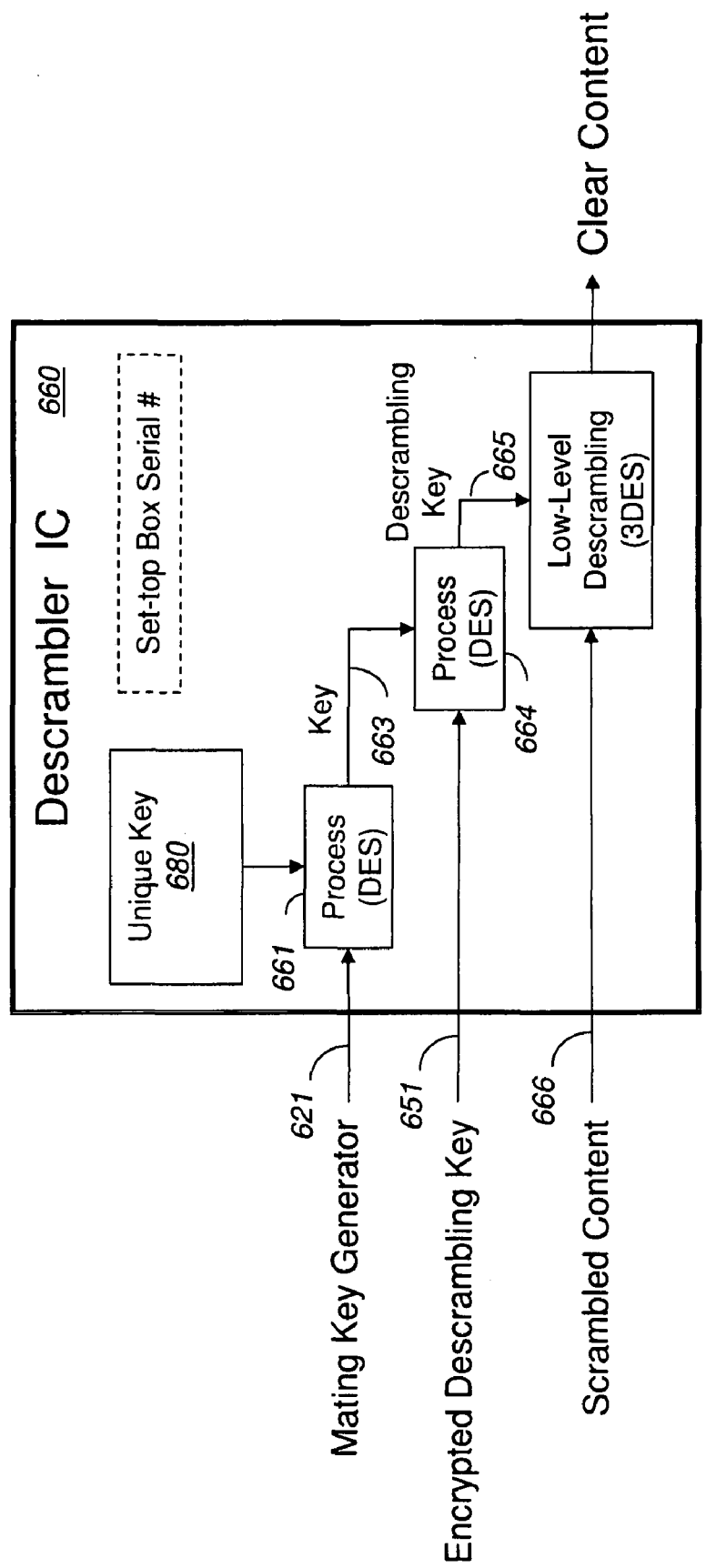
FIG. 7 is a first exemplary embodiment of a descrambler IC implemented within the decoder of the set-top box of the system of FIG. 6A.
Figure 7B:
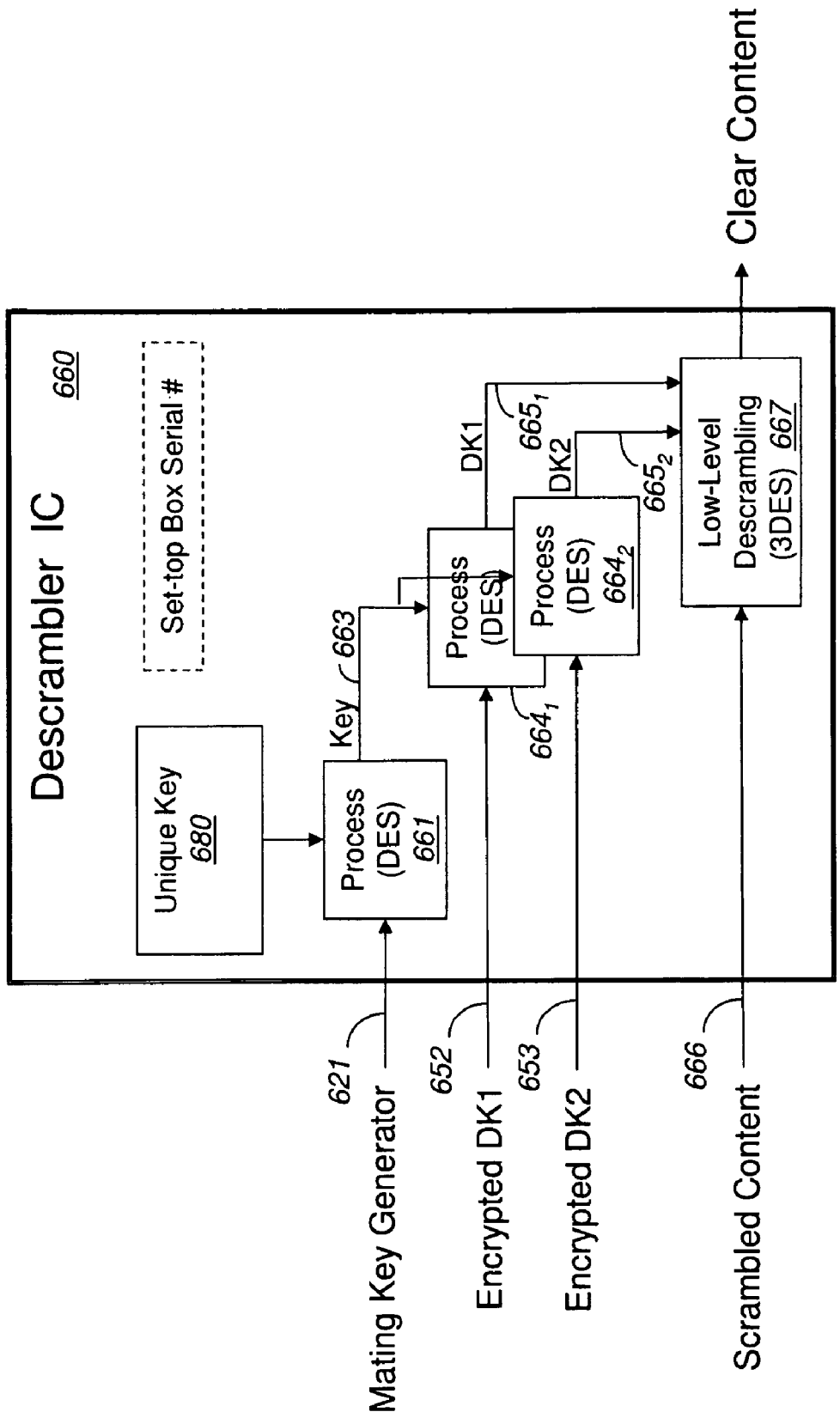
Figure 7C:
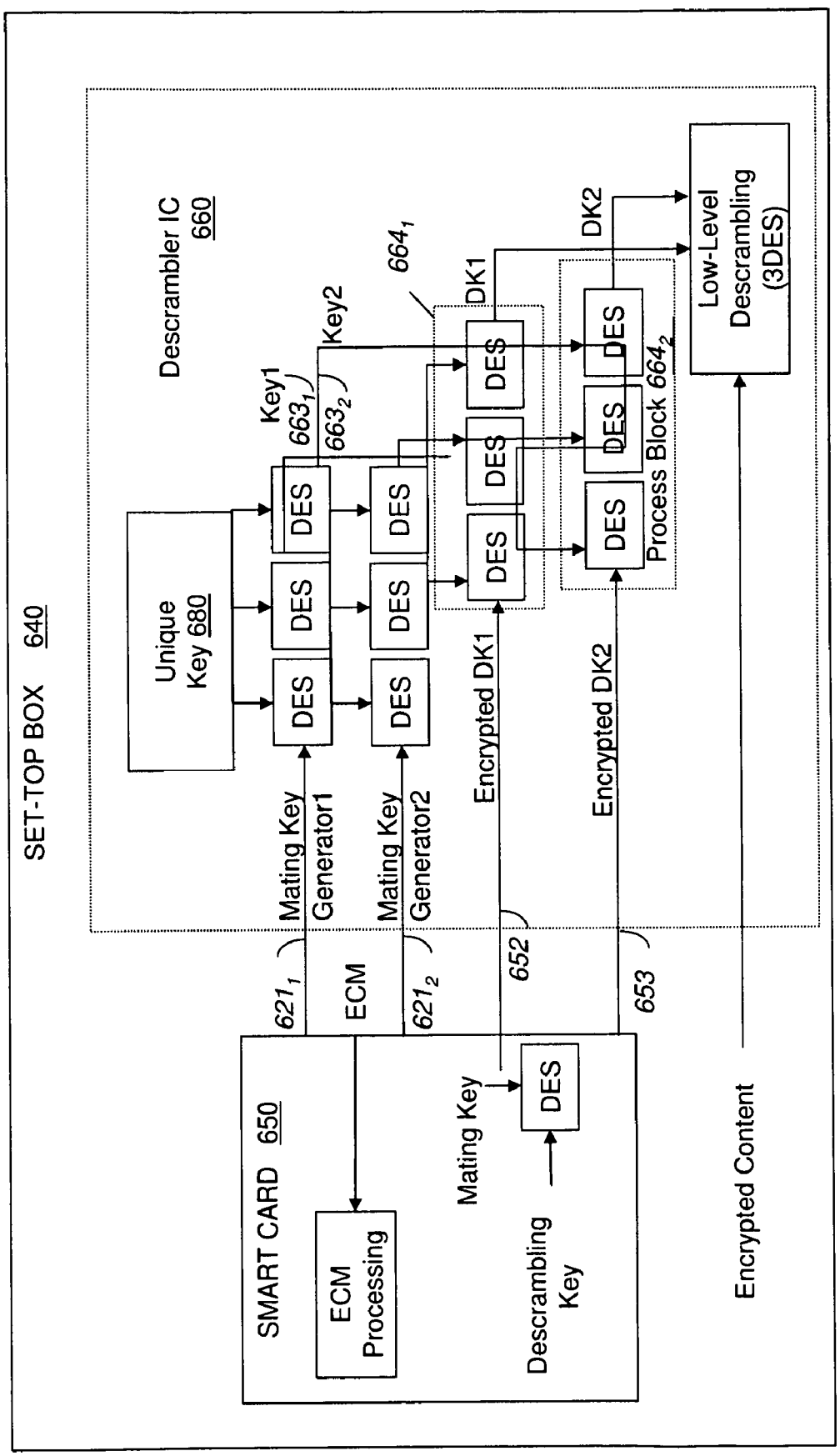

Smart card 650 receives EMM 648 and forwards mating key generator 621 and an encrypted descrambling key 651 recovered from ECM 642 to descrambler IC 660 of set-top-box 640 as described in FIGS. 7A-7C.

FIG. 7A is a first exemplary embodiment of descrambler IC 660 implemented within set-top box 640 of FIG. 6A. On receipt of mating key generator 621 and encrypted descrambling key 651 from smart card 650, descrambler IC 660 comprises a first process block 661 that performs an encryption operation on mating key generator 621 using Unique Key 680 stored in descrambler IC 660. The encryption operation may be in accordance with symmetric key cryptographic functions such as DES, AES, IDEA, 3DES and the like. The "DES" operation is shown merely for illustrative purposes.

The encryption operation on mating key generator 621 produces a key 663 identical to mating key 622, which is loaded into a second process block 664. Process block 664 is used to decrypt encrypted descrambling key 651 to produce a descrambling key 665. Descrambling key 665 is used for descrambling scrambled content 666 loaded into set-top box 640 and in particular descrambler IC 660. Descrambling may include performance of 3DES operations on scrambled content 666. The result is content in a clear format, which may be transmitted from descrambler IC 660 and subsequently loaded into a MPEG decoder as shown in FIG. 5 or optionally into a D/A converter, DVI Interface or IEEE 1394 interface.

It is contemplated that process blocks 661 and 664 may be altered to support decryption and encryption respectively, depending on how mating key 622 is formulated.

FIG. 7B is a second exemplary embodiment of descrambler IC 660 implemented within set-top box 640 of FIG. 6A. The descrambling is in accordance with 3DES with 2 keys. As set forth in FIG. 7A, descrambler IC 660 comprises a first process block 661 that performs an encryption operation on mating key generator 621 using Unique Key 680.

The encryption operation on mating key generator 621 produces key 663, which is identical to mating key 622. The key 663 is loaded into two DES process blocks 664$_1$ and 664$_2$. Process block 664$_1$ is used to decrypt a first encrypted descrambling key 652 to produce a first descrambling key (DK1) 665$_1$. Process block 664$_2$ is used to decrypt a second encrypted descrambling key 653 to produce a second descrambling key (DK2) 665$_2$. DK1 665$_1$ and DK2 665$_2$ are used by a low-level 3DES descrambling logic 667 for descrambling scrambled content 666.

Of course, it is further contemplated that process block 661 may be configured to support 3DES with multiple keys as shown in FIG. 7C. For this embodiment, multiple mating key generators 621$_1$ and 621$_2$ are provided by smart card 650 to produce two keys 663$_1$ and 663$_2$ that are provided to process blocks $664_1$ and $664_2$, respectively. These process blocks $664_1$ and $664_2$ produce descrambling keys $665_1$ and $665_2$ that are used by a low-level 3DES descrambling logic 667 for descrambling scrambled content 666.

As illustrated in FIG. 7C, a first mating key generators $621_1$ may be configured as mating key generator 621 of FIG. 6B. However, a second mating key generators $621_2$ may be configured to authenticate copy protection parameters placed into key $663_2$. For instance, second mating key generators $621_2$ may comprise a copy control information (CCI) field that provides copy controls and a content identifier field that identifies incoming content to which the copy controls are applied. For instance, the CCI field may identify that the content cannot be copied for persistent storage or may be copied a certain number of times (once, twice, etc.). The CCI field may be used to identify the number of times that the content can be played back or sets prescribed viewing times for such content.

The second mating key generators $621_2$ may further comprise a Content ID field including a value that identifies the digital content associated therewith and may include data to manage validity/expiration of the digital content. The second mating key generators $621_2$ may further comprise a Copy Generation Number field including a value that identifies the number of times the digital content can be copied. Of course, to reduce the size of the fields, multiple parameters may be hashed and stored in the fields.

Figure 8:
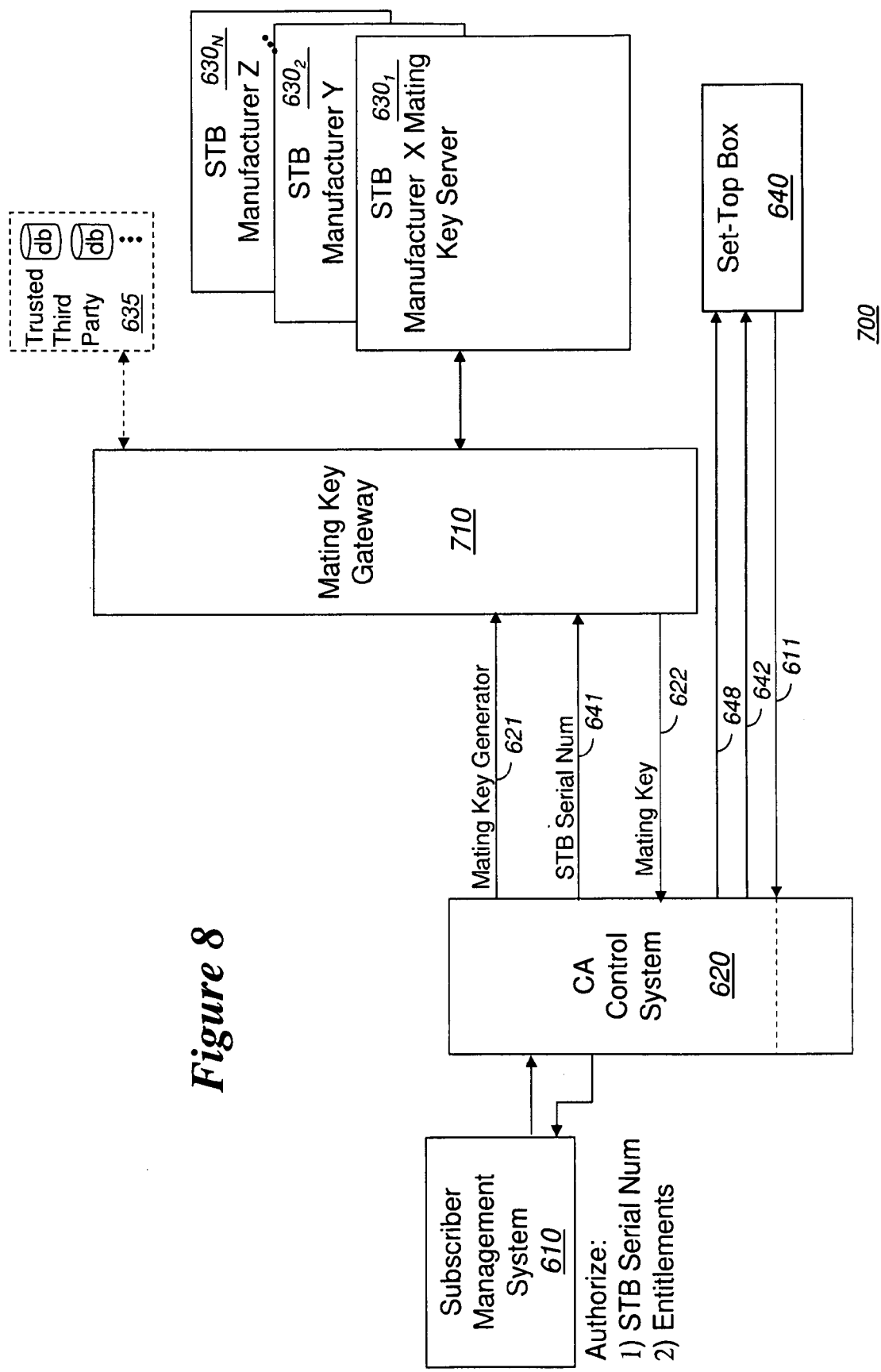
FIG. 8 is a fourth exemplary embodiment of a secure content delivery system.

Referring now to FIG. 8, a fourth exemplary embodiment of a secure content delivery system 700 is shown. Secure content delivery system 700 comprises subscriber management system 610, CA control system 620, a mating key gateway 710, mating key servers $630_1$-$630_N$ and set-top box 640. In lieu of transmitting mating key generator 621 and STB Serial Num 641 from CA control system 620 to mating key servers $630_1$-$630_N$ as shown in FIG. 6A, such information may be routed to mating key gateway 710. Mating key gateway 710 accesses the STB Manufacturer ID 623 of FIG. 6B from mating key generator 621 and appropriately routes mating key generator 621 and STB Serial Num 641 to a selected mating key server $630_i$. This reduces the amount of processing time by CA control system 620 or servers $630_1$-$630_N$ to recover mating key 622.

Alternatively, instead of mating key gateway 710 routing mating key generator 621 and STB Serial Num 641 to the selected mating key server $630_i$, it is contemplated that such information may be routed to trusted third party 635, which accesses a targeted database for retrieval of a mating key. The database selected for retrieval of mating key 622 is based on values associated with mating key generator 621 and/or STB Serial Num 641. For instance, each database may be accessible over a range of addresses based on values associated within mating key generator 621 and/or STB Serial Num 641. These values are used to identify the targeted database.

Figure 9A:
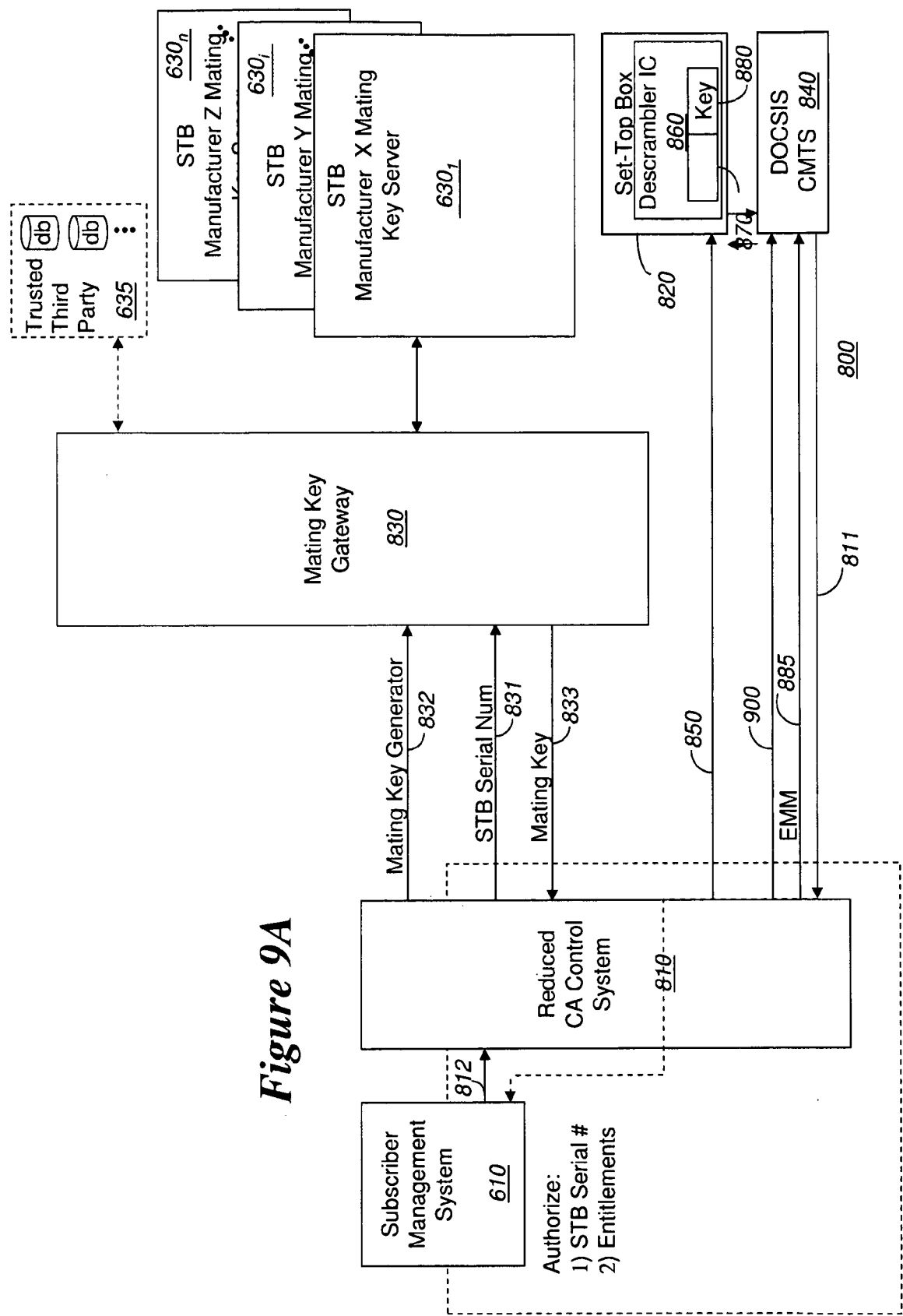
FIG. 9A is a fifth exemplary embodiment of a secure content delivery system.

FIG. 9A is a fifth exemplary embodiment of a secure content delivery system 800. Secure content delivery system 800 comprises subscriber management system 610 and a CA control system 810, a plurality of mating key servers $630_1$-$630_N$ associated with different set-top box manufacturers, a set-top box 820, a mating key gateway 830 (similar to gateway 710 of FIG. 8), and a network interface 840 (e.g., DOCSIS CMTS). Set-top box 820 comprises a descrambler IC 860 including local memory 870 configured to store a unique key 880 (referred to as "Unique Key") of set-top box 820. The Unique Key 880 is loaded during IC manufacturer or creation of set-top box 820.

Figure 9C:
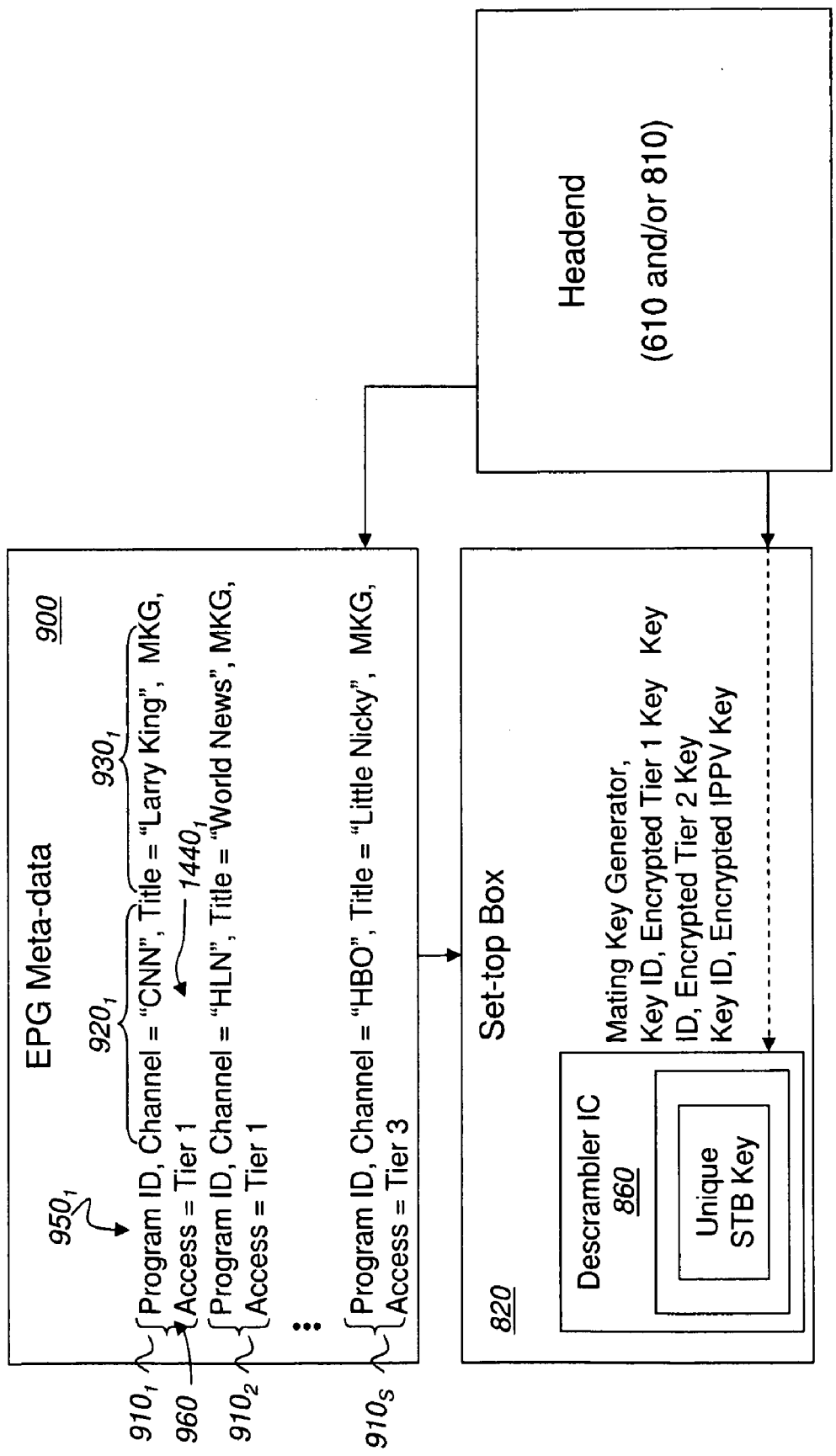
FIG. 9C is an exemplary embodiment of meta-data associated with an electronic program guide (EPG) routed to the set-top box of the system of FIG. 9A.

Set-top box 820 receives electronic program guide (EPG) meta-data with the EPG in an unscrambled format and receives digital programming content 850 in a scrambled format. In one embodiment, EPG meta-data 900 is provided out-of-band by CA control system 810. As shown in FIG. 9C, one embodiment of EPG meta-data 900 includes multiple tag entries $910_1$-$910_S$ ($S \geq 1$) for different types of content provided by a content provider. Each tag entry $910_j$ ($1 \leq j \leq S$) comprises at least a channel name $920_j$, a name of the content $930_j$, and a key identifier $940_j$ indicating the tier of service associated with the channel. In addition, each tag entry $910_j$ further comprises a program identifier (PID) $950_j$ and a mating key generator (MKG) $960_j$. Meta-data 900 is used to provide a mating key generator (e.g., mating key generator 621) and key identifier(s) for verification of the keys provided in the EMM 885.

Referring back to FIG. 9A, once a user of set-top box 820 desires to receive particular type of content (e.g., PPV movie, broadcast channel, etc.), set-top box 820 determines whether entitlements associated with the requested content are already stored therein. If the entitlements are not stored, the user may be notified directly through a screen display or audio playback and prompted to provide a request 811 to subscriber management system 610 (or CA control system 810). Alternatively, the request 811 may be sent automatically without user control. Request 811 may be provided out-of-band (e.g., telephone call or e-mail over Internet via DOCSIS) as shown, or in-band to subscriber management system 610.

As shown for this embodiment, upon receiving an authentication message 815 from subscriber management system 610, including STB Serial Num 831 and entitlements (or looking up STB Serial Num 831 at CA control system 810), CA control system 810 routes STB Serial Num 831 and mating key generator 832 to mating key gateway 830. Mating key gateway 830 operates as an intermediary to coordinate delivery of mating key 833 that is used to extract the requested content from downloaded, scrambled information. Of course, CA control system 810 may perform an authentication scheme with mating key gateway 830 in order to establish secure communications there between.

Upon receipt of mating key 833, CA control system 810 generates one or more entitlement management message (EMM) 885. No ECMs are provided; only channel keys over EMM 885 for example. One embodiment of EMM 885 is illustrated in FIG. 9B.

As shown in FIG. 9B, EMM 885 comprises at least two of the following: STB Serial Num 831, EMM length field 842, mating key generator 832, "M" ($M \geq 1$) key identifiers $844_1$-$844_M$ and encrypted service keys $846_1$-$846_M$ associated with key identifiers $844_1$-$844_M$, respectively. Of course, other types of entitlements besides identifiers or service keys may be included in EMM 885 and the size (in bits) of these values can be varied. Also, it is contemplated that mating key generator 832 may be excluded from EMM 885 and sent separately and generally concurrent with EMM 885.

STB Serial Num 831 is a value that is used to indicate a particular set-top box and perhaps the manufacturer of the set-top box. "EMM length field" 842 is a bit value that is used to indicate the length of EMM 885. Mating key generator 832, as shown, is a bit value that includes the parameters forth above in FIG. 6B. Each "key identifier" $844_1$-$844_M$ is a 16-bit value that indicates a tier of service associated with a corresponding encrypted service key $846_1$-$846_M$, respectively. The encrypted service keys $846_1$-$846_M$ are decrypted by a key produced within descrambler IC 860 that corresponds to mating key 833 of FIG. 9A.

Figure 10:
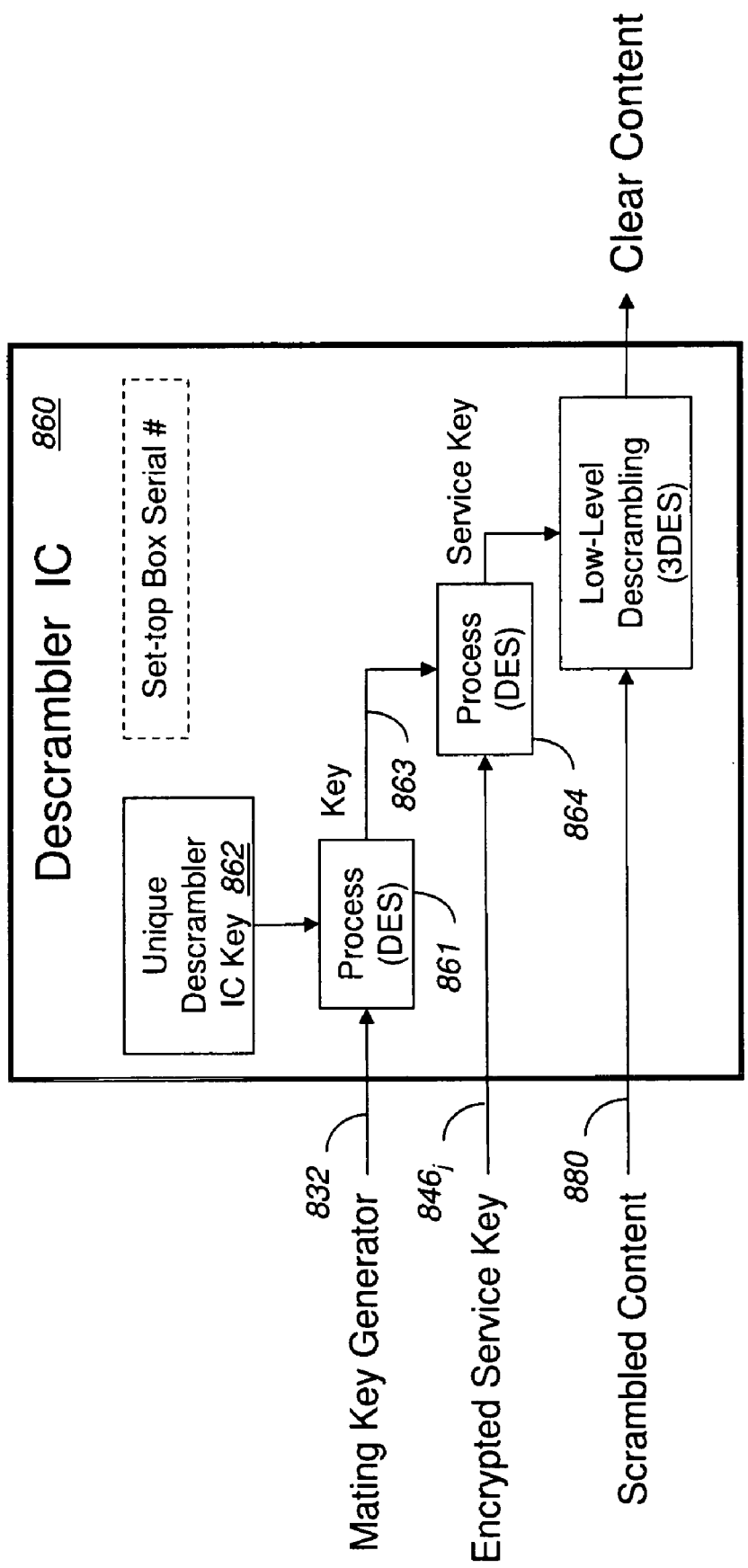
FIG. 10 is a first exemplary embodiment of the descrambler IC implemented within the set-top box of FIG. 9A.

FIG. 10 is a first exemplary embodiment of descrambler IC 860 implemented within set-top box 820 of FIG. 9A. On receipt of mating key generator 832 and encrypted service keys $846_j$ ($1 \leq j \leq M$) included in EMM 885, descrambler IC 860 comprises a first process block 861 that performs an encryption operation on mating key generator 832 using Unique Key 880 previously stored in descrambler IC 860. The encryption operation may be in accordance with symmetric key cryptographic functions such as DES, AES, IDEA, 3DES and the like. Of course, it is contemplated that process block 861 may be altered to perform a hashing function in lieu of an encryption function.

The encryption operation on mating key generator 832 produces a key 863 that is identical to mating key 833. Key 863 is loaded into a second process block 864 that is used to decrypt the encrypted service key $846_j$ to recover the service key used to descramble scrambled content 850 loaded into set-top box 840 and in particular the descrambler IC 860. Descrambling may include performance of 3DES operations on the scrambled content. The result may be content in a clear format, which is transmitted from descrambler IC 860 and subsequently loaded into a MPEG decoder as shown in FIG. 5 or optionally into a D/A converter, DVI Interface or IEEE 1394 interface.

Figure 11:
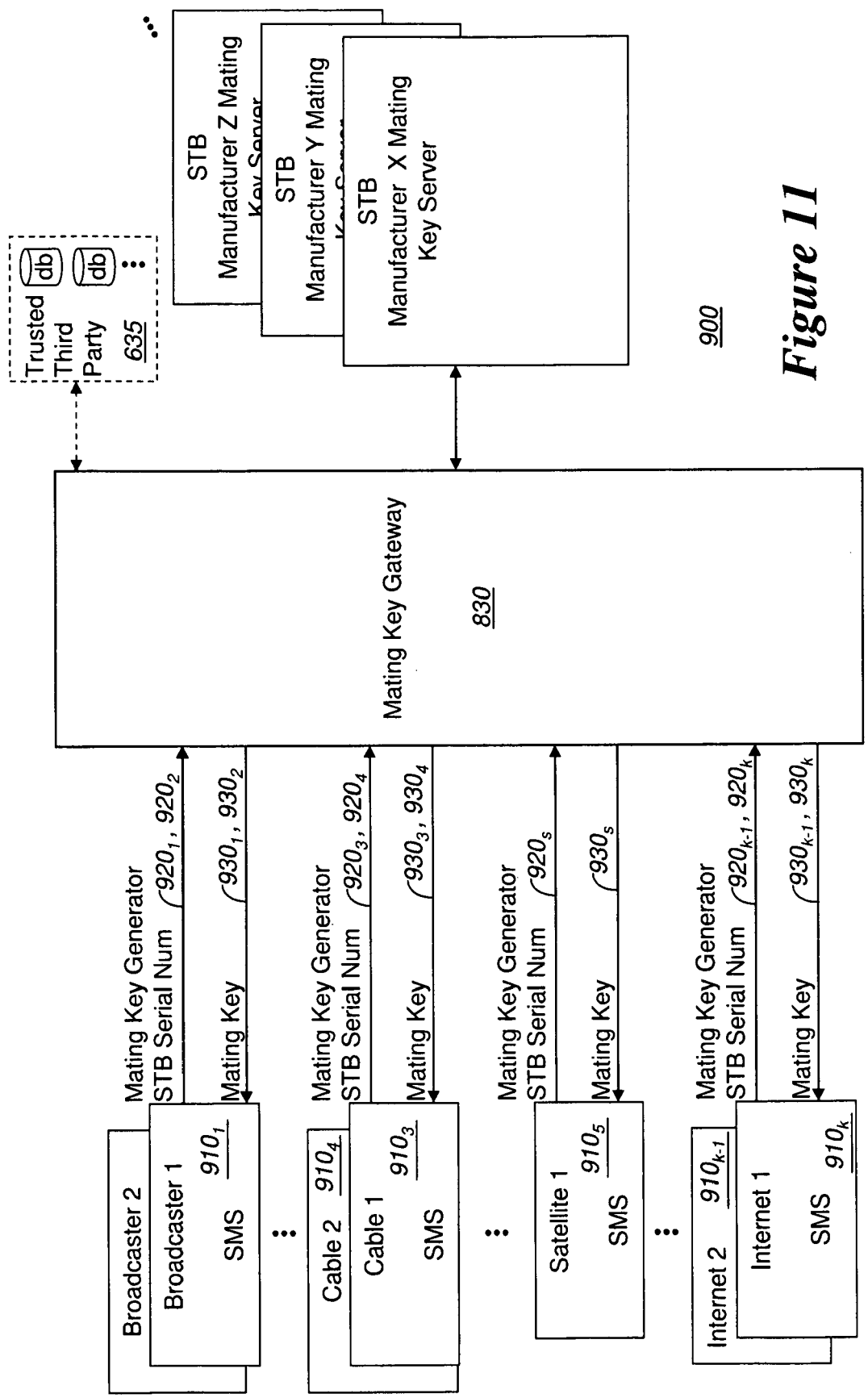
FIG. 11 is a portion of a sixth exemplary embodiment of a secure content delivery system.

Referring now to FIG. 11, a portion of a sixth exemplary embodiment of a secure content delivery system 900 is shown. In lieu of subscriber management system 610 and CA control system 810 of FIG. 9A, mating key gateway 830 may be adapted for communications with a plurality of subscriber management systems (SMS) $910_1$-$940_K$ ($K \geq 1$) each associated with a different content provider. Each of these subscriber management systems $910_1$-$910_K$ supply mating key generators and STB Serial Nums $920_1$-$920_K$ to mating key gateway 830 and, in return, receive corresponding mating keys $930_1$-$930_K$. These mating keys $930_1$-$930_K$ are used to encrypt service keys provided to one or more targeted set-top boxes (not shown). Alternatively, trusted third party 635 may be utilized as shown in FIGS. 6A, 8 and 9A.

For example, for this illustrated embodiment, subscriber management systems $910_1$ and $910_2$ are terrestrial broadcasters, each providing mating key generators and STB Serial Nums $920_1$, $920_2$ to mating key gateway 830 and receiving corresponding mating keys $930_1$, $930_2$. Similar in operation, subscriber management systems $910_3$ and $910_4$ are cable operators, subscriber management system $910_5$ is a direct broadcast satellite (DBS) company, and subscriber management systems $910_{K-1}$ and $910_K$ are Internet content sources.

Referring to FIG. 12, a portion of a seventh exemplary embodiment of a secure content delivery system 1000 is shown. A set-top box 1010 of the system 1000 receives scrambled or encrypted content 1020 from a first source and an entitlement management message (EMM) 1040 from a second source. The second source may be a smart card or a CA control system.

In accordance with one embodiment of the invention, EMM 1040 comprises a copy protection key generator (CPKG) 1042 and an encrypted user key 1041. As shown in FIGS. 12 and 13, encrypted user key ($E_{key}$) 1041 is a value that is calculated to generate a copy protection key 1035 in descrambler IC 1030 when $E_{key}$ 1041 is decrypted by a unique key ("Unique Key") 1031 or a derivative thereof. Unique Key 1031 is loaded during IC manufacturer or creation of set-top box 1010. Copy protection key 1035 is shared with other devices, such as another set-top box 1070, a portable computer (e.g., PDA) 1071, or even a portable jukebox 1072, for decryption purposes.

As shown in FIG. 14, CPKG 1042 comprises STB manufacturer ID 1050, System ID 1051 to identify a system that provides EMM 1040 (e.g., similar to CA Provider ID 625 of FIG. 6B) Content Provider ID 1052 to identify the provider of the digital content (e.g., similar to Service Provider ID 624 of FIG. 6B), and CP Sequence Number 1053 being generally equivalent in purpose to Mating Key Sequence Number 626 of FIG. 6B. In addition, CPKG 1042 includes a Copy Protection Status value 1054 that provides content management controls such as whether or not the incoming content can be copied, number of times for playback, or date/time of playback.

Referring back to FIG. 13, an embodiment of the descrambler IC 1030 receives $E_{key}$ 1041, CPKG 1042 and an encrypted descrambling key 1043 from the second source. CPKG 1042 is substantially equivalent to mating key generator 832 of FIG. 9A. Descrambler IC 1030 comprises a first process block 1032 that decrypts $E_{key}$ 1041 with Unique Key 1031 in accordance with symmetric key cryptographic functions such as DES, AES, IDEA, 3DES and the like.

The decryption operation on $E_{key}$ 1041 recovers the user key 1033, which is loaded into a second process block 1634 that is used to encrypt CPKG 1042 to produce copy protection key 1035. Encrypted descrambling key 1043 is decrypted using Unique Key 1031 (or derivative thereof) to recover the descrambling key is a clear format for descrambling and/or decrypting the encrypted content 1020 loaded into set-top box 1010 and in particular descrambler IC 1030. Descrambling and/or decrypting may include performance of 3DES operations.

As a result, the content is temporarily placed in a clear format, but is routed to low-level encryption logic 1060, which encrypts the descrambled content with copy protection key 1035 associated with any or all of the destination digital devices. As a result, the content is secure during subsequent transmissions.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than in a restrictive sense.

What is claimed is:

1. A descrambler integrated circuit comprising:
   a local memory to store a unique key;
   a first process block, using the unique key, to perform at least two successive cryptographic operations on a first mating key generator in order to produce a first key;
   a second process block, using the first key, to perform at least two successive cryptographic operations on a second mating key generator in order to produce a second key;
   a third process block, using the first key and the second key, to decrypt a first encrypted descrambling key to recover a first descrambling key;
   a fourth process block, using the first key and the second key, to decrypt a second encrypted descrambling key to recover a second descrambling key; and
   a descrambler to descramble the scrambled digital content using both the first descrambling key and the second descrambling key in order to produce digital content in a clear format.

2. The descrambler integrated circuit of claim 1, wherein the first process block and the second process block operate in accordance with Triple Data Encryption Standard (3DES).

3. The descrambler integrated circuit of claim 1, wherein the third process block and the fourth process block operate in accordance with Triple Data Encryption Standard (3DES).

4. The descrambler integrated circuit of claim 1, wherein the third process block, using the first key, performing at least two decryption operations and at least one encryption operation on the first encrypted descrambling key in succession.

5. The descrambler integrated circuit of claim 1, wherein the second mating key generator comprises a first field that provides copy controls and a second field that identifies incoming content to which the copy controls apply.

6. The descrambler integrated circuit of claim 4, wherein the second mating key generator further comprises a third field including a value that identifies the number of times the digital content can be copied.

7. The descrambler integrated circuit of claim 1 being in communication with a smart card to receive the first mating key generator and the second mating key generator provided from the smart card.

8. A system comprising:
an input to receive a plurality of mating key generators, the plurality of mating key generators including a first mating key generator and a second mating key generator differing from the first mating key generator; and
a descrambler integrated circuit coupled to the input, the descrambler integrated circuit comprising:
a local memory to store a unique key,
a first process block, using the unique key, to perform cryptographic operations on the first mating key generator in order to produce a first key,
a second process block, using the first key, to perform cryptographic operations on the second mating key generator in order to produce a second key,
a third process block, using the first key and the second key, to decrypt a first encrypted descrambling key to recover a first descrambling key,
a fourth process block, using the first key and the second key, to decrypt a second encrypted descrambling key to recover a second descrambling key, and
a descrambler to descramble the scrambled digital content using both the first descrambling key and the second descrambling key in order to produce digital content in a clear format.

9. The system of claim 8, wherein the first process block performs at least two successive cryptographic operations on the first mating key generator using the unique key in order to produce the first key, and the second process block performs at least two successive cryptographic operations on the second mating key generator using the first key in order to produce the second key.

10. The system of claim 8, wherein the input includes an interface to receive a smart card.

11. The system of claim 8, wherein the first process block and the second process block operate in accordance with Triple Data Encryption Standard (3DES).

12. The system of claim 8, wherein the third process block and the fourth process block operate in accordance with Triple Data Encryption Standard (3DES).

13. The system of claim 9, wherein the third process block, using the first key, performing at least two decryption operations and at least one encryption operation on the first encrypted descrambling key in succession.

14. The system of claim 8, wherein the second mating key generator comprises a first field that provides copy controls and a second field that identifies incoming content to which the copy controls apply.

15. The system of claim 14, wherein the second mating key generator further comprises a third field including a value that identifies the number of times the digital content can be copied.

16. The system of claim 10, wherein the descrambler IC is in communication with a smart card to receive the first mating key generator and the second mating key generator provided from the smart card.

* * * * *

UNITED STATES PATENT AND TRADEMARK OFFICE
CERTIFICATE OF CORRECTION

| | | |
|---|---|---|
| PATENT NO. | : 7,920,703 B2 | Page 1 of 2 |
| APPLICATION NO. | : 12/402060 | |
| DATED | : April 5, 2011 | |
| INVENTOR(S) | : Brant L. Candelore | |

It is certified that error appears in the above-identified patent and that said Letters Patent is hereby corrected as shown below:

In The Drawings

Please delete Drawing Sheet 18 of 19 and substitute the attached Drawing Sheet 18 of 19.

Signed and Sealed this
Ninth Day of December, 2014

Michelle K. Lee
*Deputy Director of the United States Patent and Trademark Office*